United States Patent [19]

Nakano et al.

[11] 4,224,643

[45] Sep. 23, 1980

[54] AUTOMATIC TRACKING SERVO CONTROL SYSTEM

[75] Inventors: Kenji Nakano, Yokohama; Tadahiko Nakamura, Kanagawa, both of Japan

[73] Assignee: Sony Corporation, Tokyo, Japan

[21] Appl. No.: 945,121

[22] Filed: Sep. 25, 1978

[30] Foreign Application Priority Data

Sep. 26, 1977 [JP] Japan ............................... 52-114696

[51] Int. Cl.[2] ....................... G11B 27/04; G11B 15/46; G11B 5/08; H02K 27/20

[52] U.S. Cl. ....................................... 360/70; 318/301; 360/73; 360/85

[58] Field of Search ............................. 360/70, 73, 85; 318/301, 314

[56] References Cited

U.S. PATENT DOCUMENTS

| | | | |
|---|---|---|---|
| 3,663,763 | 5/1972 | Trost | 360/70 |
| 3,663,764 | 5/1972 | Trost et al. | 360/70 |
| 3,764,755 | 10/1973 | Yamashita et al. | 360/70 |
| 4,003,090 | 1/1977 | Beck | 360/70 |
| 4,004,205 | 1/1977 | Yamamoto et al. | 360/70 |

FOREIGN PATENT DOCUMENTS

| | | |
|---|---|---|
| 1414844 | 11/1975 | United Kingdom . |
| 1455890 | 11/1976 | United Kingdom . |
| 1474012 | 5/1977 | United Kingdom . |

*Primary Examiner*—Daryl W. Cook

*Attorney, Agent, or Firm*—Lewis H. Eslinger; Alvin Sinderbrand

[57] ABSTRACT

An automatic tracking servo control system which is adapted to control the tracking of at least one rotary signal reproducing transducer which scans successive parallel record tracks on a movable record medium. Position pulses are generated when the transducer rotates into predetermined position with respect to the record medium, and these position pulses are used in conjunction with control signals which are reproduced from the record medium and which had been recorded at spaced locations therealong in predetermined relation to the record tracks for controlling the position of the transducer with respect to the tracks scanned thereby. A detector detects the relative strength of the signal reproduced by the transducer during periodic intervals. A phase shift circuit shifts the phase of the position pulses by a selected amount during successive scanning cycles of the transducer, this amount being periodically adjusted as a function of the difference between the relative signal strengths in successive periodic intervals. The phase-shifted position pulses are used in a servo circuit, together with the control pulses, to control the tracking of the rotary head.

22 Claims, 50 Drawing Figures

FIG. 1A
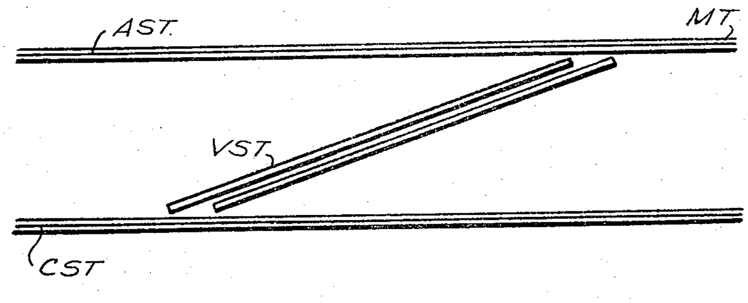
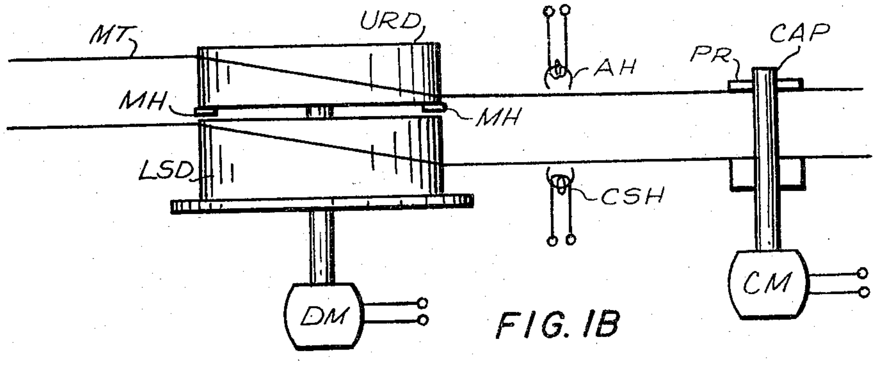
FIG. 1B
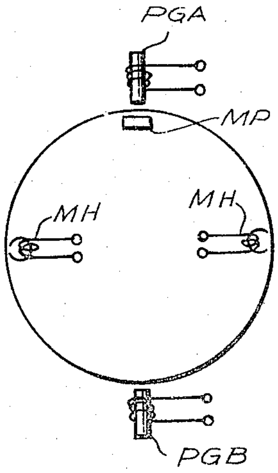
FIG. 1C

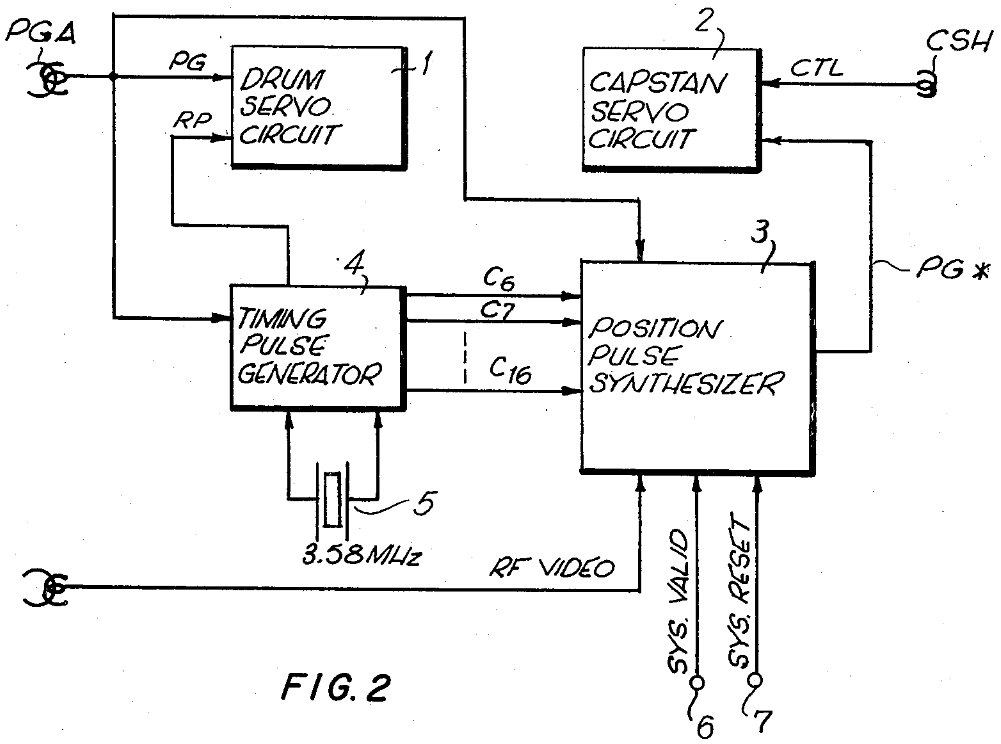
FIG. 2
FIG. 3A
FIG. 3B
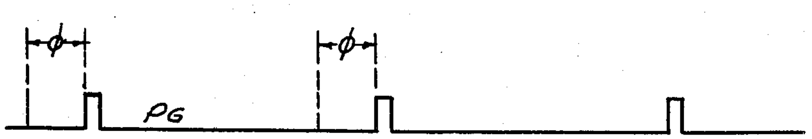
FIG. 3C
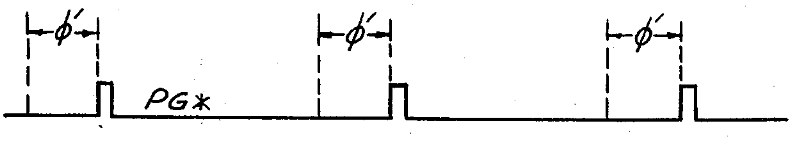

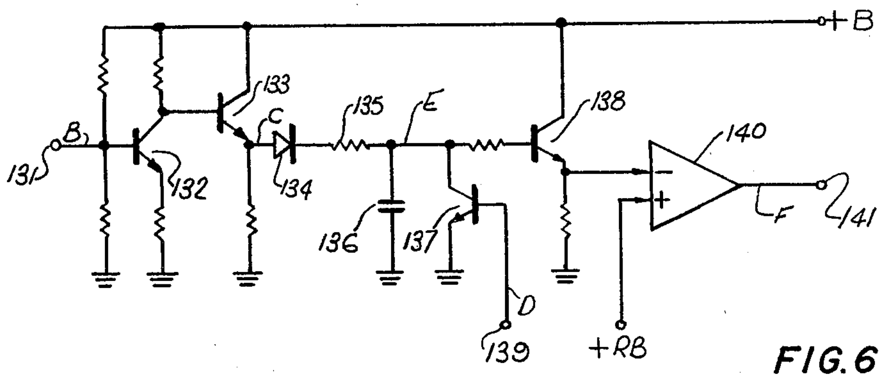
FIG. 6
FIG. 7A
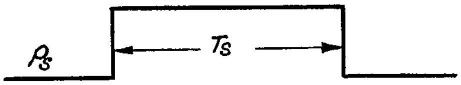
FIG. 7B
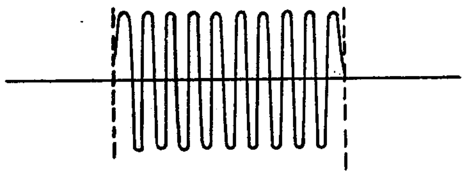
FIG. 7C
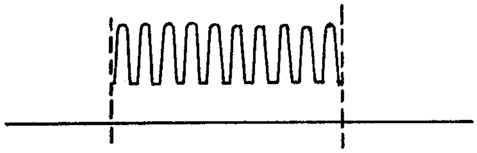
FIG. 7D
FIG. 7E
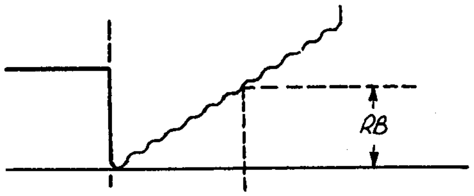
FIG. 7F
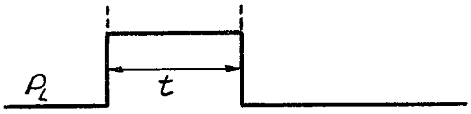

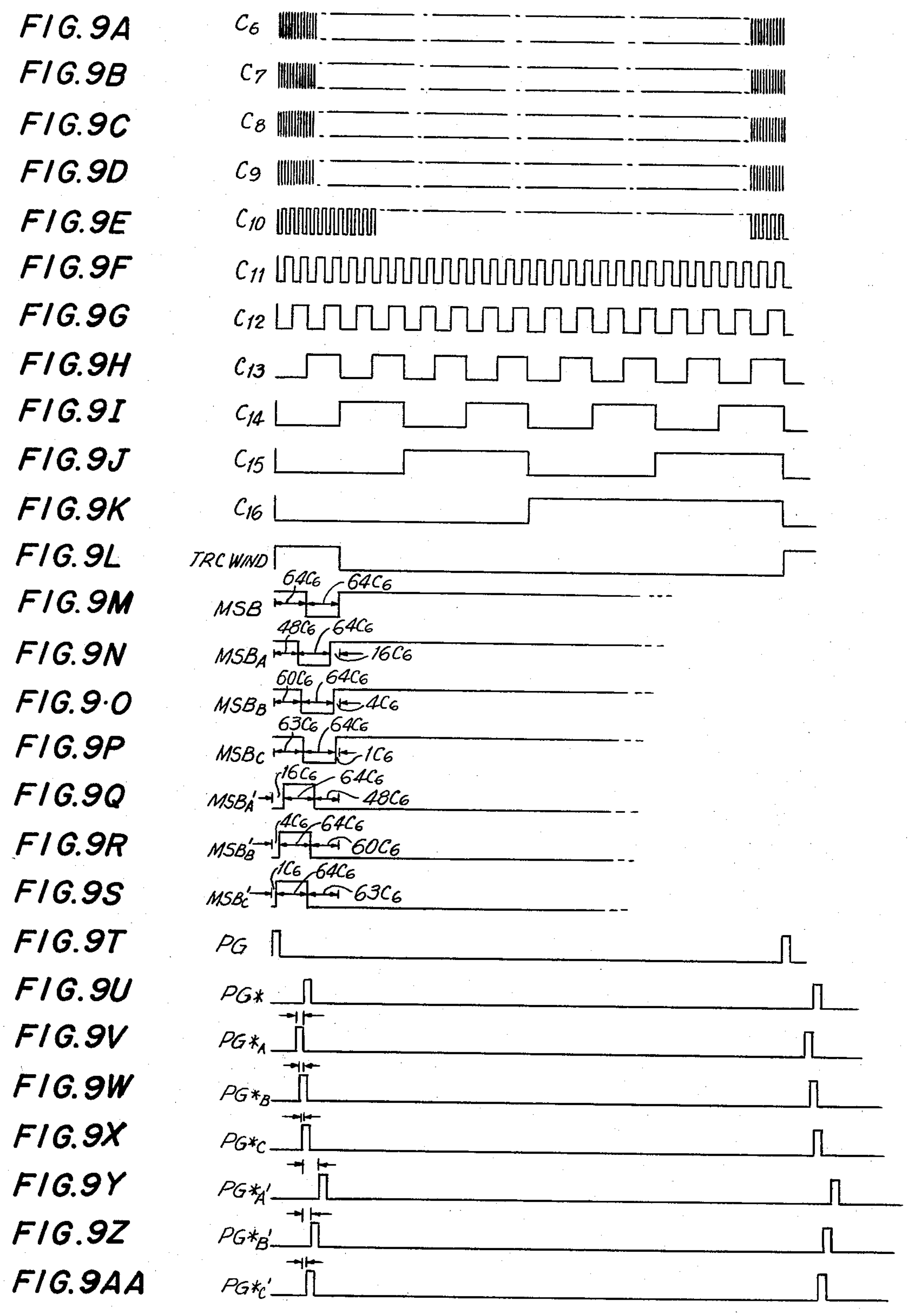
FIG. 9A C6
FIG. 9B C7
FIG. 9C C8
FIG. 9D C9
FIG. 9E C10
FIG. 9F C11
FIG. 9G C12
FIG. 9H C13
FIG. 9I C14
FIG. 9J C15
FIG. 9K C16
FIG. 9L TRC WIND
FIG. 9M MSB 64C6 64C6
FIG. 9N MSBA 48C6 64C6 16C6
FIG. 9·O MSBB 60C6 64C6 4C6
FIG. 9P MSBC 63C6 64C6 1C6
FIG. 9Q MSB'A 16C6 64C6 48C6
FIG. 9R MSB'B 4C6 64C6 60C6
FIG. 9S MSB'C 1C6 64C6 63C6
FIG. 9T PG
FIG. 9U PG*
FIG. 9V PG*A
FIG. 9W PG*B
FIG. 9X PG*C
FIG. 9Y PG*'A
FIG. 9Z PG*'B
FIG. 9AA PG*'C

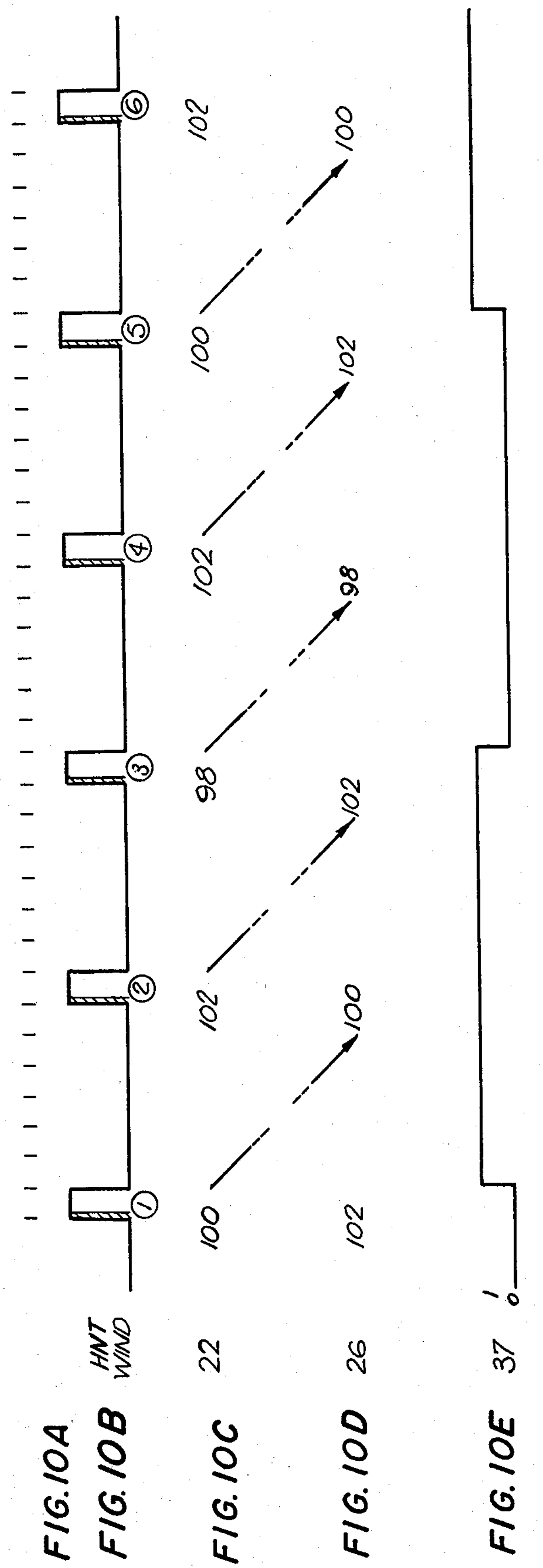
FIG. 10A
FIG. 10B
FIG. 10C
FIG. 10D
FIG. 10E
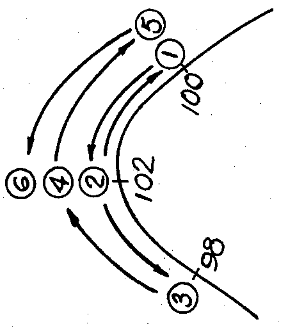
FIG. 11

AUTOMATIC TRACKING SERVO CONTROL SYSTEM

BACKGROUND OF THE INVENTION

This invention relates to an automatic tracking servo control system for use in reproducing apparatus wherein at least one rotary transducer scans successive parallel record tracks on a movable record medium to reproduce information therefrom and, more particularly, to such a system wherein proper tracking control is attained even if certain parameters which had been present during recording are changed during reproduction.

As is known, a wide-band signal can be recorded advantageously on a movable record medium by use of one or more rotary transducers, or heads, which scan parallel tracks across the record medium. One example of such a wide-band signal is a video signal, for example, a composite color video signal, and one example of recording apparatus of the aforementioned type is a video tape recorder (VTR). In a typical VTR, the recording head or heads are rotated at a relatively high rate while the tape is moved so as to record skewed, parallel tracks. The recorded information is reproduced by scanning such record tracks with one or more rotary playback heads. As is conventional, the same head which is used to record signals also can be used to reproduce such signals.

It is appreciated that, in order to obtain an accurate reproduction of the signals which are recorded in parallel tracks, a proper relationship must exist between the rotary head, or heads, and the track being scanned. That is, the head or heads must be rotated at the same speed during a reproducing operation as during a recording operation; and the magnetic tape likewise must be transported at the same speed during both a recording and a reproducing operation. Still further, each head must be positioned so as to sweep across the particular record tracks which is being scanned in proper alignment with that track. To achieve this, a typical VTR includes a tracking servo system.

In a reproducing operation, the aforementioned tracking servo system is operated so as to control the relative movement between the rotary head or heads and the magnetic tape. Generally, the head or heads are rotated at a fixed, precisely controlled speed. Hence, the servo system is effective to control the speed at which the tape is transported. This tape speed is adjusted, if necessary, in order to bring the heads into exact alignment with the tracks being scanned. To accomplish this, position pulses are generated when the head or heads rotate into predetermined positions relative to the tape. For example, a position pulse is generated when the head first rotates into magnetic relation with the tape. Also, a series of control pulses, which had been recorded in predetermined, spaced position along the length of tape, are reproduced and used in conjunction with the position pulses to control the relative movement, and thus the position, of the heads and tape. Typically, each control pulse is recorded so as to be spaced a predetermined amount from a corresponding record track. When the control pulses are reproduced, each exhibits a predetermined phase shift with respect to a position pulse. Consequently, a proper tracking relation is achieved if this predetermined phase relation is maintained. The tracking servo system functions to adjust the transport speed of the tape in order to maintain this phase relation.

A tracking servo system of the type described above generally operates satisfactorily if the same recording machine that had been used to record the signal information also is used to reproduce that information. However, if different machines are used for recording and reproduction, or if various operating parameters change from the recording operation to the reproducing operation, the tracking servo system might perform less than satisfactorily. For example, if different machines are used, the speed of the rotary heads in one machine may differ from that in the other. Also, if the respective machines are of the so-called "helical-scan" type, the length and angle of the respective head scanning traces may differ. Still further, the recorded tape may stretch or shrink prior to the time that the information thereon is reproduced. These factors, as well as others not mentioned herein, will impede the satisfactory operation of the tracking servo system so as to hinder a proper servo "lock".

To account for the aforementioned factors, a manual adjustment may be provided in order to manually change the phase relation between the reproduced control pulses and the generated position pulses. For example, a potentiometer may be provided to adjust the phase of the control pulse. That is, in order to obtain a servo locked condition, the reproduced control pulse may be delayed by an adjustable amount so as to exhibit a new phase relation with respect to a position pulse. It is this new phase relation which results in the aforementioned servo lock condition. Such a manual adjustment may require great care from a skilled technician. It may be exceedingly difficult to effect the desirable manual adjustment by the user of, for example, a home-entertainment VTR.

An improved automatic tracking servo control system is disclosed in our copending application Ser. No. 940,269, filed Sept. 7, 1978. In that system, the aforenoted difficulties are overcome by automatically adjusting the phase of the control signals as a function of the difference between the strength of the signals reproduced during one interval and the strength of the signals reproduced during a preceding interval. If the earlier-reproduced signal strength is greater than the later-reproduced signal strength because of an increase in the tracking error, the direction in which the control signal has been phase shifted is changed by an incremental amount. However, if the later-reproduced signal strength is greater than the earlier-reproduced signal strength because the scanning traces of the rotary heads and the record tracks are brought toward alignment so as to reduce the tracking error, then the direction in which the control signals are incrementally phase shifted is maintained. One aspect of the above system is to shift the phase of the control signals so that the tracking of the rotary head hunts above the correct phase thereof so as to change its tracking condition in search for an improved condition.

The present invention is directed to a further improvement in an automatic tracking servo control system.

OBJECTS OF THE INVENTION

Therefore, it is an object of the present invention to provide an improved tracking servo control system for use in signal reproducing apparatus of the type wherein recorded control signals are reproduced from a record medium while at least one rotary transducer scans parallel record tracks which have been recorded on that medium.

Another object of this invention is to provide an improved tracking servo control system of the aforedescribed type wherein reproduced control pulses are used in conjunction with position pulses, the latter representing the position of the rotary transducer, in order to control the head to scan parallel record tracks precisely.

A further object of this invention is to provide an automatic tracking servo control system of the aforedescribed type wherein the phase relation between the reproduced control signals and the position pulses is adjusted automatically to compensate for various factors which might otherwise prevent proper tracking.

An additional object of this invention is to provide an improved servo control system of the aforedescribed type wherein the position pulses representing the position of a rotary transducer in signal reproducing apparatus are phase-shifted in order to attain a proper servo lock of the transducer relative to record tracks in a record medium from which signals are reproduced.

Yet another object of this invention is to provide an improved automatic tracking servo control system of the aforedescribed type which functions automatically to accomplish the same objective as tracking servo control systems which heretofore relied upon manual adjustments in order to attain proper tracking control of a rotary transducer with respect to parallel record tracks.

Various other objects, advantages and features of the present invention will become readily apparent from the ensuing detailed description, and the novel features will be particularly pointed out in the appended claims.

SUMMARY OF THE INVENTION

In accordance with this invention, a servo control system is provided for controlling the tracking of at least one rotary signal reproducing head which scans successive parallel record tracks on a movable record medium. A position pulse generator generates position pulses when the head rotates into a predetermined position with respect to the record medium, and a control transducer reproduces control signals which have been recorded along the record medium in predetermined, spaced relation with respect to the tracks. The position pulses and control signals are used in combination to control the relative position of the head with respect to the tracks scanned thereby. A detector detects the relative strength of the signal reproduced by the head during periodic intervals. A phase shift circuit shifts the phase of the position pulses by a selected amount during successive scanning cycles of the head, this amount being periodically adjusted as a function of the difference between the relative signal strengths in successive periodic intervals. The phase-shifted position pulses are used to lock the tracking condition of the rotary head.

BRIEF DESCRIPTION OF THE DRAWINGS

The following detailed description, given by way of example, will best be understood in conjunction with the accompanying drawings in which:

FIG. 1A is a diagramatic representation of a portion of a record medium to which the present invention is applicable;

FIG. 1B is a diagramatic representation of the recording/reproducing apparatus with which this invention can be used;

FIG. 1C is a diagramatic plan view of the rotary scanning apparatus with which the present invention is used;

FIG. 2 is a block diagram of a servo control system which incorporates the present invention;

FIGS. 3A–3C are waveform diagrams which are useful in understanding the operation of the servo control system shown in FIG. 2;

FIG. 6 is a schematic diagram of one embodiment of a portion of the apparatus shown in FIG. 5;

FIGS. 7A–7F are waveform diagrams which are useful in understanding the operation of the embodiment shown in FIG. 6;

FIGS. 9A–9AA are waveform diagrams which are useful in understanding the operation of the logic diagram of FIG. 8;

FIGS. 10A–10D are waveform diagrams which are useful in explaining the present invention; and FIG. 11 is a diagrammatic representation of the operation of the present invention.

DETAILED DESCRIPTION OF A PREFERRED EMBODIMENT

Figure 4:
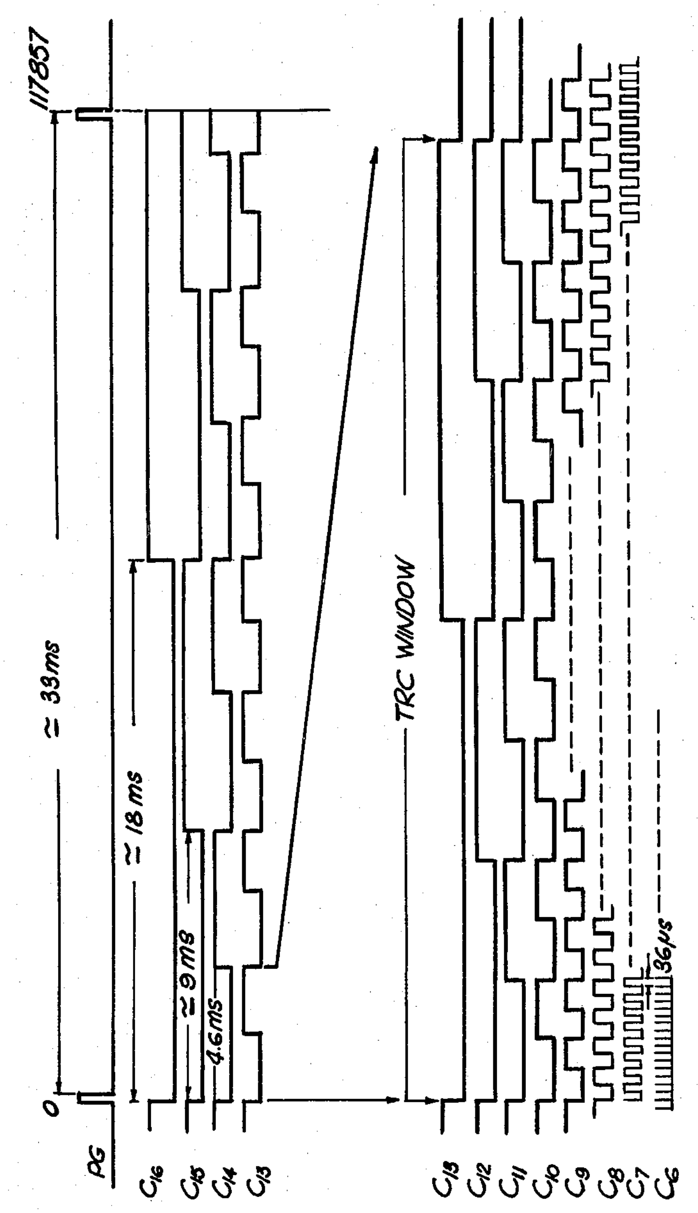
FIG. 4 is a timing diagram of the timing signals generated in the servo control system shown in FIG. 2.

As will become apparent from the following description, the present invention is readily applicable to signal reproducing apparatus in general wherein one or more rotary transducers scan parallel tracks across a movable record medium. A particular example of such apparatus as described herein is a video tape recorder (VTR) wherein two heads spaced 180° apart are rotated to scan parallel skewed tracks across magnetic tape. Typically, the tape is deployed about a guide drum upon which the rotary heads are mounted. In a typical VTR, the tape is helically wrapped about the periphery of the guide drum to exhibit a wrap angle of at least 180°. In this configuration, the information recorded on the magnetic tape appears as shown in FIG. 1A. As illustrated, magnetic tape MT has a plurality of parallel, skewed video signal tracks VST recorded thereon, each video track containing the video information included in a field interval. Adjacent video tracks VST may be separated from each other by a guard band, as shown in FIG. 1A; or, alternatively, adjacent tracks may be in abutting or even overlapping relation, as is known to those of ordinary skill in the video recording art. An audio signal track AST is recorded along one longitudinal edge of magnetic tape MT, and a control signal track CST is recorded along the other longitudinal edge of the magnetic tape. As one example thereof, a control pulse may be associated with every other video track. That is, one control pulse is recorded for each frame interval of video signals. Moreover, the control pulse which is associated with a particular video track is recorded in a particular, spaced apart location in control signal track CST relative to its associated video signal track VST. This spaced apart, or phase, relation is such that when a rotary magnetic transducer, such as a playback head, rotates into magnetic contact with magnetic tape MT, an associated control pulse is reproduced from control signal track CST by a separate, fixed control signal transducer. As will be described, for proper tracking control, this relation between the rotary playback head and the reproduced control pulse is maintained during the reproducing operation.

A diagrammatic representation of the apparatus which is used to record/reproduce information onto/from magnetic tape MT is shown in FIG. 1B. A guide drum is formed of a lower stationary drum LSD and an upper rotary drum URD, the upper rotary drum being provided with a pair of magnetic heads MH spaced apart from each other by 180°. Magnetic tape MT is helically wrapped about the surface of the guide drum so as to be disposed about a portion of each of lower drum LSD and upper drum URD, as shown. As one example, magnetic tape MT is helically wrapped about the guide drum by an angle of about 180°.

A drum motor DM is coupled to and rotary drives a shaft which is mechanically coupled to upper rotary drum URD. Drum motor DM drives upper rotary drum URD at an angular velocity of thirty rotations per second. It is seen that two video signal tracks VST are scanned across the surface of magnetic tape MT for each rotation of upper rotary drum URD. Hence, in one second, sixty tracks are scanned.

As drum motor DM drives upper rotary drum URD, magnetic tape MT is transported by the combination of a capstan CAP and a pinch roller PR. In conventional manner, pinch roller PR is urged against capstan CAP to engage magnetic tape MT therebetween. A capstan motor CM is mechanically coupled to capstan CAP to drive the capstan at a desired transport speed.

As also shown in FIG. 1B, an audio head AH is disposed in alignment with audio signal track AST so as to record audio signals therein during a recording operation. The audio head AH also may be operated to reproduce audio signals from audio signal track AST during a reproducing operation. Similarly, a control signal head CSH is positioned in alignment with control signal track CST so as to record the aforementioned control signals in the control signal track during a recording operation. The same, or a similar, control signal head CSH may be used to reproduce the recorded control signals during a reproducing operation. As will be described below, the combination of the reproduced control signals, or pulses, and the sensed position of magnetic heads MH is used to control the tracking relation of the magnetic heads with respect to video signal tracks VST. As mentioned previously, a control pulse is recorded for every other video signal track. Hence, during a recording operation, control signal head CSH records pulses at the rate of 30 Hz longitudinally spaced along control signal track CST.

FIG. 1C is a top plan diagrammatic view of upper rotary drum URD. It is seen that magnetic heads MH are mounted in diametriccally opposed relation with respect to each other. In order to detect the positions of these magnetic heads, a magnetic element MP is mounted on upper rotary drum URD. This magnetic element may be positioned along any radial line; and in FIG. 1C is illustrated as being secured to the periphery of the upper rotary drum. Hence, as the upper rotary drum is driven by drum motor DM, magnetic heads MH as well as magnetic element MP rotate. A pair of oppositely disposed magnetic sensors PGA and PGB are provided adjacent upper rotary drum URD. As examples, these sensors may be magnetic coils or other conventional magnetic pick-up devices adapted to generate a pulse when magnetic element MP is rotated therepast. Thus, as upper rotary drum URD rotates, sensor PGA functions as a position pulse generator to generate a position pulse PGA′ when one of the magnetic heads rotates to a predetermined position, such as into magnetic contact with magnetic tape MT. Then, when the other magnetic head rotates into this predetermined position, sensor PGB functions as a position pulse generator to generate a position pulse PGB′ when magnetic element MP rotates therepast. It is appreciated that the repetition rate of each of position pulses PGA′ and PGB′ is equal to the rotational speed of upper rotary drum URD, i.e., 30 Hz. These position pulses are 180° out-of-phase with respect to each other because of the diametrically opposite positions of position pulse generators PGA and PGB.

Referring now to FIG. 2, there is illustrated a block diagram of a tracking servo control system which utilizes the position pulses generated by position pulse generator PGA as well as the control pulses reproduced by the control signal head CSH and which incorporates the present invention. This tracking servo control system includes a drum servo circuit 1 for controlling the rotation of upper rotary drum URD, and thus the rotation of magnetic heads MH mounted thereon, a capstan servo circuit 2 for controlling the operation of capstan motor GM, and thus the longitudinal movement of magnetic tape MT, a position pulse synthesizer 3 adapted to generate synthesized position pulses PG* which are phase-shifted relative to position pulses PG generated by position pulse generator PGA, and an oscillator 4 adapted to generate a series of timing pulses $C_6$–$C_{16}$ of different repetition rates. Drum servo circuit 1 is responsive to the position pulses PG generated by position pulse generator PGA and also to reference pulses RP having a constant, fixed repetition rate and generated by oscillator 4. As an example, reference pulses RP may have a frequency of 30 Hz and are used by the drum servo circuit to control the rotation of magnetic heads MH such that these heads rotate at a constant, fixed rate of 30 rps. That is, drum servo circuit 1 is operative to maintain the rotation of the magnetic heads in synchronism with the fixed reference pulses RP.

Capstan servo circuit 2 is responsive to control pulses CTL reproduced from magnetic tape MT by control signal head CSH, and also to synthesized position pulses PG* generated by position pulse synthesizer 3. The purpose of the capstan servo circuit is to maintain a predetermined phase relation between control pulses CTL and synthesized position pulses PG* by controlling the relative positions of the parallel video tracks VST on magnetic tape MT with respect to the scanning traces of magnetic heads MH. That is, the capstan servo circuit functions to control the transport speed of magnetic tape MT so as to position the video tracks VST thereon in proper alignment with the scanning traces of magnetic heads MH. Such a capstan servo circuit is well known to those of ordinary skill in the art and, in the interest of brevity, further description thereof is not provided.

Position pulse synthesizer 3 is shown and described in greater detail hereinbelow with respect to the embodiment shown in FIGS. 5 and 8. This position pulse synthesizer includes an input terminal for receiving the RF video signal reproduced from video tracks VST by magnetic heads MH, an input terminal 6 for receiving a system valid signal SYS VALID which is generated by a VTR system control circuit (not shown) a short time (for example, one or two seconds) after the reproducing mode of operation is selected, and an input terminal 7 for receiving a system reset signal SYS RESET which is generated each time that the power supply of the VTR is energized or each time that the recording medium, for example, a video tape cassette, is changed. Position pulse synthesizer 3 also receives the position pulse PG generated by position pulse generator PGA, and the respective timing pulses $C_6$–$C_{16}$ generated by oscillator 4. The manner in which the various signals supplied to the position pulse synthesizer are used therein for generating the synthesized position pulse PG* will be described below. Suffice it to say that the synthesized position pulse PG* is generated as a phase-shifted version of position pulse PG with the effective phase shift imparted to position pulse PG to obtain the synthesized position pulse PG* being either a positive or negative phase shift, depending upon the relation between the scanning trace of the magnetic heads MH and the video tracks VST which are recorded on magnetic tape MT.

Oscillator 4 may include a crystal-controlled oscillating circuit connected to a crystal element 5 for generating an oscillating signal having a frequency equal to 3.58 MHz, the frequency of the chrominance subcarrier of a composite color video signal in accordance with the NTSC system. Oscillator 4 additionally may include a frequency divider circuit, such as a counter, binary divider, or the like, which operates to divide the frequency of the oscillating signal so as to produce respective timing pulses of lower frequencies, some of which timing pulses are designated $C_6$–$C_{16}$, of progressively decreasing frequencies. The frequency divider circuitry is adapted to be reset to an initial condition in response to each position pulse PG generated by position pulse generator PGA. Thus, timing pulses $C_6$–$C_{16}$ are synchronized with position pulses PG.

The principle of operation of the tracking servo control system illustrated in FIG. 2 now is explained with reference to the waveforms shown in FIGS. 3A–3C. When one of magnetic heads MH rotates into predetermined position with respect to magnetic tape MT, a corresponding position pulse PG, shown in FIG. 3B, is generated. It will be assumed that this position pulse is generated by position pulse generator PGA. As a particular track is scanned by magnetic head MH during a reproducing operation, a control pulse CTL, shown in FIG. 3A, is reproduced by control signal head CSH. It is seen that the phase difference between control pulse CTL and position pulse PG is represented as $\phi$. Let it be further assumed that this phase difference $\phi$ is the correct phase relation between the control and position pulses such that when this phase relation obtains, magnetic heads MH always will scan the video tracks VST correctly. If this phase relation changes, capstan servo circuit 2 operates to change the speed of the capstan motor so as to effect a shift in the position of the video tracks relative to the scanning traces of the magnetic heads, thereby restoring the proper phase relation $\phi$ as seen from FIGS. 3A and 3B.

If, because of tape shrinkage or tape stretching, or because of other factors mentioned above, the phase relation $\phi$ will result in erroneous tracking of the record tracks by magnetic heads MH, it is necessary to change this predetermined phase relation. That is, if the phase difference $\phi$, shown in FIGS. 3A and 3B, is maintained, heads MH may not scan the video tracks VST properly. However, the tracking servo control system functions to maintain this phase difference $\phi$. Hence, in order to utilize the tracking servo control system even in the presence of tape shrinkage, tape stretching or any of the other aforementioned factors, position pulse PG is phase-shifted so as to exhibit a phase difference $\phi'$ with respect to control pulse CTL, as shown in FIG. 3C.

In accordance with the present invention, a proper phase adjustment of position pulse PG is obtained by synthesizing a phase-shifted version thereof PG*. That is, the synthesized position pulse PG* may be thought of as a phase-shifted version of position pulse PG, this phase shift being of positive or negative polarity, that is, appearing as a phase delay or phase advance, so that the synthesized position pulse PG*, also referred to herein as a phase-modified position pulse, may exhibit the phase relation $\phi'$ shown in FIG. 3C. In accordance with one aspect of this invention, the synthesized position pulse PG* is phase-shifted periodically to correspondingly shift the tracking condition of the magnetic heads relative to the video tracks. This shift in the tracking condition permits the detection of a difference in the level of the video signals which are reproduced by magnetic heads MH during two successive periodic intervals. Theoretically, the tracking condition of the magnetic heads can be sensed by detecting any deviation between the video signals reproduced thereby and the maximum reproducible signal level. However, it is difficult to provide circuitry which detects the maximum video signal level over a period of time. Hence, by this invention, the phase of the synthesized position pulse PG* oscillates, or hunts, about the desired phase difference $\phi'$ (FIG. 3C) by small amounts in periodic intervals. That is, the tracking condition is changed periodically in order to detect whether the present tracking condition, as determined by the signal strength of the reproduced video signals, is better than the previous tracking condition. The hunting of the synthesized position pulse PG* about the desired, fixed phase relation $\phi'$ results in a close approximation thereof of this desired phase relation. This corresponds to a close approximation of the desired tracking condition of the rotary magnetic heads relative to the recorded video tracks. As may be appreciated, in a typical servo control system, the phase relation $\phi$ between position pulse PG and control pulse CTL is about 2–3 msec.

FIG. 4 represents a timing waveform diagram of the respective timing pulses $C_6 \ldots C_{16}$ generated by oscillator 4, together with the position pulse PG generated by position pulse generator PGA. As mentioned above, oscillator 4 may comprise a crystal-controlled oscillating circuit for generating an oscillating signal whose frequency is equal to 3.58 MHz. This oscillating signal is supplied to a digital counter which, for example, may be a 17-bit counter whose count is incremented by each pulse of the oscillating signal so as to count from zero to 117,857. This 17-bit counter is reset to an initial zero count by each generated position pulse PG; and it is seen that successive position pulses are separated by approximately 117,857 oscillating pulses.

For the purpose of convenience, timing pulses $C_6 \ldots C_{13}$ are shown in an expanded scale relative to timing pulses $C_{14} \ldots C_{16}$ and position pulses PG. The frequency of timing pulses $C_{16}$ is one-half the frequency of timing pulses $C_{15}$ which, in turn, is one-half the frequency of timing pulses $C_{14}$, and so on. Thus, the period of timing pulses $C_6$, referred to later herein as clock pulses, is equal to 36$\mu$ sec, while the periods of the remaining timing pulses are progressively increased. Thus, it is seen that the period of timing pulses $C_{13}$ is equal to 4.6 msec, the period of timing pulses $C_{14}$ is equal to 9 msec, the period of timing pulses $C_{15}$ is equal to 18 msec, and the period of timing pulses $C_{16}$ is equal to 33 msec. It is appreciated that the period of timing pulses $C_{16}$ is determined by the separation of position pulses PG which are used to reset oscillator 4. Since successive position pulses PG are separated by 33 msec, this establishes the period of timing pulses $C_{16}$. For a purpose to be described below, the period of timing pulses $C_{13}$ immediately following the occurrence of position pulse PG is designated as a phase shift window TRCWIND. It is recognized that a phase shift window pulse can be generated by an AND gate at the time of occurrence of timing pulses $C_{14}$, $C_{15}$ and $C_{16}$ all exhibiting their relatively low levels $(\overline{C_{14}}\cdot\overline{C_{15}}\cdot\overline{C_{16}})$. This phase shift window TRCWIND is the period during which synthesized position pulse PG* is phase shifted.

Figure 5:
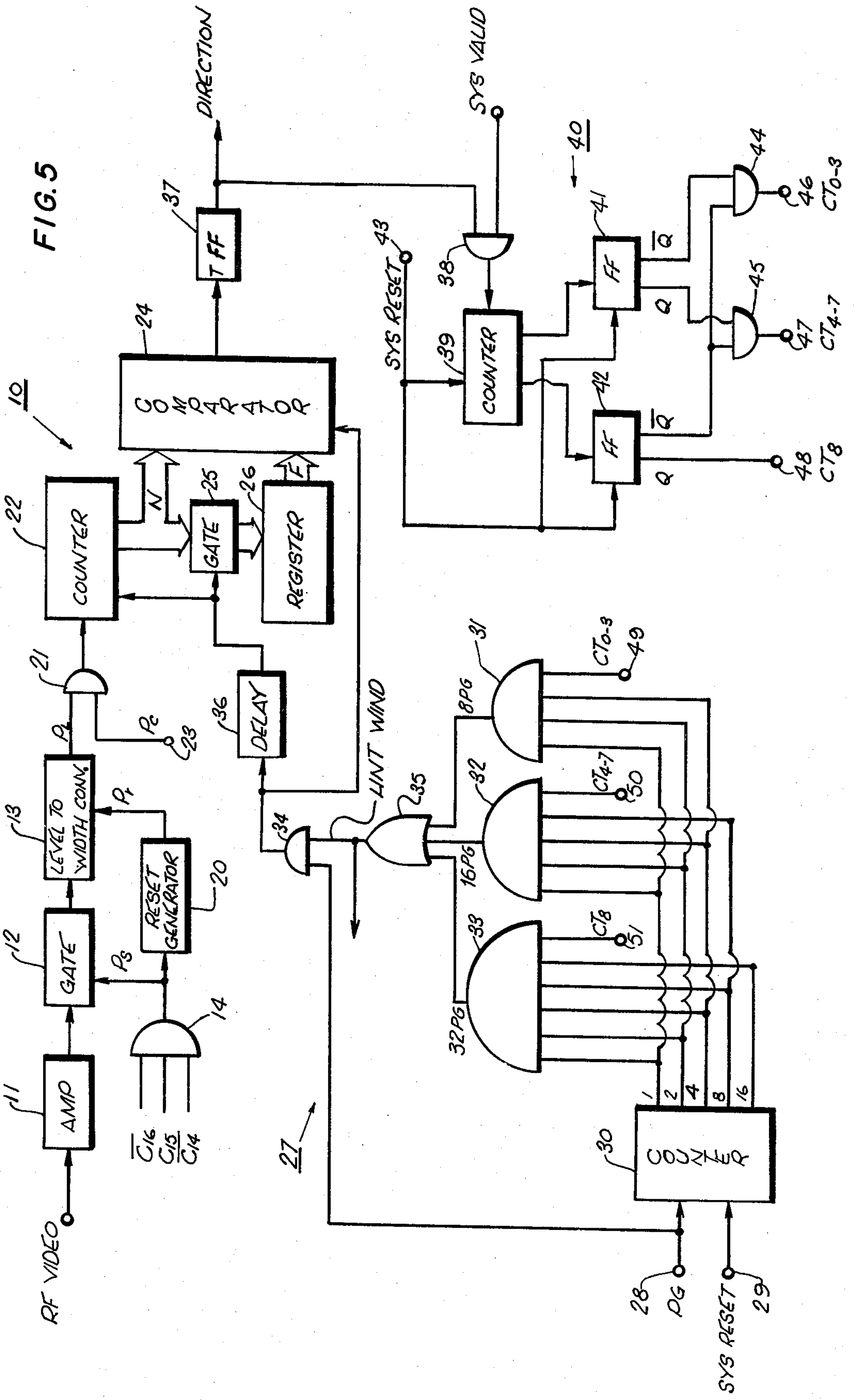
FIG. 5 is a partial block, partial logic diagram of one embodiment of the present invention.

The timing pulses shown in FIG. 4 are utilized by the present invention which is shown in the partial block, partial logic diagram of FIG. 5. The illustrated circuitry includes a signal strength measuring circuit 10 adapted to measure the relative strength of the signals reproduced by magnetic heads MH during periodic intervals, an interval defining pulse generator 27 for generating pulses defining the aforementioned periodic intervals, and an interval control circuit 40 for controlling the duration or period of the interval defining pulses. In greater detail, signal strength measuring circuit 10 is comprised of an amplifier 11, a sampling gate 12, a level-to-width converter 13, a counter 22, a register 26 and a comparator 24. Amplifier 11 is adapted to receive the RF video signal which is reproduced from magnetic tape MT by magnetic heads MH. As one example thereof, the video signal may be recorded as a frequency modulated signal. Hence, amplifier 11 may be supplied with the reproduced frequency modulated video signal of RF frequencies. It should be appreciated that the amplitude of this reproduced video signal, that is, the signal strength thereof, is determined, in part, by the tracking condition of the magnetic heads. That is, if the heads are in proper alignment with the recorded video tracks VST, then the reproduced video signals will have a greater amplitude than if the heads are in mis-alignment with such tracks.

The output of amplifier 11 is coupled to sampling gate 12. A sampling pulse $P_s$ is supplied to sampling gate 12 by an AND gate 14. AND gate 14 is supplied with timing pulses $C_{14}$, $C_{15}$ and $C_{16}$ so as to generate the sampling pulse $P_s$ during the interval that timing pulse $C_{14}$ is at its relatively lower level, timing pulse $C_{15}$ is at its relatively higher level and timing pulse $C_{16}$ is at its relatively lower level. From the waveform diagrams of FIG. 4, it is seen that this interval occurs during the approximate center portion of a scanning trace of a magnetic head. Thus, sampling gate 12 is operative in response to the sampling pulse $P_s$ to sample the video signal which is reproduced from the central portion of a video track. The tracking condition of the magnetic heads is best determined when the scanning traces thereof reach their respective central portions. Spurious signals which may be produced when the magnetic head rotates into and out of magnetic contact with the magnetic tape are avoided at this central portion and, therefore, the strength of the reproduced video signal is a more accurate determination of the alignment of the heads with respect to the video tracks.

Sampling gate 12 is coupled to level-to-width converter 13 which functions to convert the sampled magnitude of the reproduced video signal to a corresponding pulse duration. The level-to-width converter also is coupled to a reset generator 20 for receiving a reset pulse $P_r$, generated in response to a sampling pulse $P_s$, so as to be reset to an initial condition awaiting the next sampled video signal. The resultant pulse which is generated by level-to-width converter 13 is referred to herein as the measurement pulse $P_L$, and the duration of this measurement pulse is determined by counter 22. It is recognized that the measured duration of measurement pulse $P_L$ is a direct representation of the signal strength of the reproduced video signal.

Counter 22, which may be a digital counter, is coupled to level-to-width converter 13 via an AND gate 21, the latter being connected to an input terminal 23 for receiving higher frequency counting pulses $P_c$ which, for example, may be generated by oscillator 4. The number of counting pulses $P_c$ supplied to counter 22 is, of course, determined by the width of measurement pulse $P_L$ during each measurement cycle. Counter 22 also is supplied with an interval defining pulse HNTWIND, described in greater detail below, to be reset periodically to an initial count, such as a zero count. As will be explained, the period separating successive interval defining pulses is equal to a number of scanning cycles of magnetic heads MH. This means that a number of measurement pulses $P_L$ are generated during this period. Hence, the count of counter 22 is incremented by counting pulses $P_c$ a number of times during each interval defined by the interval defining pulses HNTWIND. A reset terminal of counter 22 is connected to receive the interval defining pulses HNTWIND via a delay circuit 36.

The output of counter 22 is supplied to one set of inputs of comparator 24 and, through a gate 25, to register 26. Register 26 may comprise a conventional multistage storage register which is adapted to receive the count accumulated by counter 22. Gate 25, which may be a conventional gating circuit, is responsive to, for example, the leading edge of the delayed interval defining pulse HNTWIND provided at the output of delay circuit 36 for transferring the contents of counter 22 to register 26 prior to the resetting of the counter by the trailing edge of the interval defining pulse. Register 26 includes outputs which are coupled to another set of inputs of comparator 24. It is recognized that, at the time that an interval defining pulse HNTWIND is generated, the count accumulated in counter 22, referred to herein as the new count N, is supplied to comparator 24; while the immediately preceding count, referred to herein as the former count F, which had been attained by counter 22 and which had been transferred to register 26 also is supplied to the comparator.

Comparator 24 functions to determine whether the former count F stored in register 26 exceeds the present count N accumulated in counter 22. If the former count exceeds the present count ($N<F$), an output pulse is generated by comparator 24. However, if the present count exceeds the former count ($N>F$), no output pulse is generated by the comparator. As shown, an interval defining pulse HNTWIND is supplied to energize comparator 24. As one example, the trailing edge of this interval defining pulse may energize comparator 24.

A triggerable flip-flop circuit 37 is coupled to the output of comparator 24 and is adapted to change the state thereof in response to each output pulse generated by the comparator. Thus, whenever comparator 24 senses that the former count F exceeds the present count N, triggerable flip-flop circuit 37 is triggered from one state thereof to the other. The state of this flip-flop circuit is used to determine the direction in which the synthesized position pulse PG* is shifted. For example, and as will be described in greater detail below, if the output of flip-flop circuit 37 is a binary "1", a negative phase shift is imparted to the position pulse, thereby advancing the phase thereof. Conversely, if the output of flip-flop circuit 37 is a binary "0", a positive phase shift is imparted to the position pulse, thereby delaying the phase thereof. Accordingly, the output of flip-flop circuit 37 is utilized as a direction-determining signal. As the state of the flip-flop circuit changes, the direction in which the position pulse is phase-shifted is reversed.

Interval defining pulse generator 27 functions to generate interval defining pulses having a controllable period. These interval defining pulses are generated after n video tracks have been scanned by magnetic heads MH. Since the interval defining pulse serves to reset counter 22, it is appreciated that the count attained by this counter is representative of the strength of the video signal which is reproduced from n tracks. This count thus may be considered to be representative of the average signal strength from these n tracks. Of course, if the interval defining pulse is generated after four tracks have been scanned, the count attained by counter 22 will represent the signal strength of the reproduced video signal averaged over four tracks. In the embodiment shown in FIG. 5, the interval defining pulse is selectively generated after either sixteen, thirty-two or sixty-four tracks have been scanned. Of course, if desired, the interval defining pulse can be generated after any other selectable number of tracks have been scanned.

In accordance with one embodiment thereof, the interval defining pulse generator is comprised of a position pulse counter 30, AND gates 31, 32 and 33, and OR gate 35 and an AND gate 34. Position pulse counter 30 is connected to an input terminal 28 for receiving the position pulses PG generated by, for example, position pulse generator PGA. Thus, it is recognized that two video tracks VST are scanned by the two magnetic heads MH during the interval which separates adjacent position pulses PG. Counter 30 additionally is connected to an input terminal 29 for receiving the system reset signal SIS RESET which, it is recalled, is generated when the power supply for the video reproducing apparatus is turned ON, and each time that the signal recording medium is changed. Position pulse counter 30 may comprise a conventional binary counter having output terminals which are provided with a binary "1" whenever the count of the position pulse counter is incremented to a count of one, two, four, eight and sixteen, respectively. For simplification, the respective outputs of position pulse counter 30 are designated the one, two, four, eight and sixteen count outputs.

AND gate 31 is connected to the one, two and four count outputs of counter 30. Thus, when enabled, AND gate 31 generates an output pulse when eight position pulses PG have been generated, that is, each time that sixteen video tracks are scanned. Similarly, AND gate 32 is connected to the one, two, four and eight count outputs of counter 30. Hence, when enabled, AND gate 32 generates a pulse whenever sixteen position pulses PG have been counted, thus corresponding to the scanning of thirty-two video tracks. AND gate 33 is connected to the one, two, four, eight and sixteen count outputs of counter 30. Hence, this AND gate, when enabled, generates a pulse each time that thirty-two position pulses PG have been counted, thus corresponding to the scanning of sixty-four video tracks. AND gates 31, 32 and 33 additionally include enable terminals 49, 50 and 51, respectively, adapted to receive respective enable signals $CT_{O3}$, $CT_{47}$ and $CT_8$, described below.

OR gate 35 is connected to the output of each of AND gates 31, 32 and 33 so as to supply an output pulse corresponding to the counting of eight, sixteen or thirty-two position pulses, depending upon which of the AND gates is enabled. The output of OR gate 35 is used as the interval defining pulse HNTWIND, and this interval defining pulse also is supplied to AND gate 34. This AND gate is connected to input terminal 28 to receive the position pulse PG. Thus, the output of AND gate 34, which is used to energize comparator 24, transfer the count of counter 22 to register 26 and reset counter 22 is derived from the position pulse PG which is generated during the interval defining pulse HNTWIND. That is, the output of AND gate 34 corresponds to the eighth, sixteenth or thirty-second position pulse, depending upon which of AND gates 31, 32 and 33 is enabled.

Interval control circuit 40 is adapted to count each reversal in the direction of phase shift imparted to the position pulses and to generate the respective enable signals $CT_{0\text{-}3}$, $CT_{4\text{-}7}$ and $CT_8$ depending upon the number of such direction reversals which have been counted. To this effect, the interval control circuit includes a counter 39 whose input is connected to receive the direction determining signal produced by flip-flop circuit 37 via an AND gate 38. This AND gate is conditioned by the system valid SYS VALID signal which, it is recalled, is generated shortly after the VTR is changed over to its playback mode. As one example thereof, counter 39 may comprise a digital counter capable of counting at least to a count of eight. The counter additionally includes a reset input coupled to input terminal 43 to receive the system reset signal SYS RESET. As illustrated, counter 39 includes a first output terminal for supplying a signal whenever the count of the counter exceeds a count of three; and a second output terminal for supplying a signal whenever the count of the counter is equal to or greater than a count of eight. For example, if counter 39 comprises a 4-bit counter, then an output signal is produced at its first output terminal when the count reaches 0100 (i.e., a binary count of 4). An output signal is produced at the second output when the count of counter 39 reaches 1000 (i.e., a binary count of 8). The first output of counter 39 is connected to a flip-flop circuit 41, and the second output of this counter is connected to a flip-flop circuit 42. Each of these flip-flop circuits may be set-reset flip-flop devices whose set inputs are connected to the first and second outputs, respectively, of counter 39, and whose reset inputs are connected to receive the system reset signal SYS RESET. As will be appreciated, counter 39 may be of the type which remains at its maximum attainable count even though additional pulses are supplied thereto or, alternatively, may be re-cycled so as to be continually incremented in response to each such pulse.

Each of flip-flop circuits 41 and 42 includes a Q output and a $\overline{Q}$ output. A binary "1" is provided at the Q output when the flip-flop circuit is set, and a binary "1" is provided at the $\overline{Q}$ output when the flip-flop circuit is reset. An AND gate 44 is connected to the $\overline{Q}$ outputs of flip-flop circuits 41 and 42 so as to produce a binary "1" at the output 46 thereof until flip-flop circuit 41 is set in response to counter 39 being incremented to a count greater than three. At that time, the output of AND gate 44 undergoes a transition from a binary "1" to a binary "0". Since the output of this AND gate remains at a binary "1" while counter 39 is being incremented from a count of zero to and inclusive of a count of three, the output of this AND gate is referred to as an enable signal $CT_{0-3}$.

AND gate 45 is connected to the Q output of flip-flop circuit 41 and to the $\overline{Q}$ output of flip-flop circuit 42. Accordingly, it is appreciated that AND gate 45 supplies a binary "0" to output terminal 47 for all counts of counter 39 except for the counts of four, five, six and seven. When counter 39 attains a count of four, flip-flop circuit 41 is set, while flip-flop circuit 42 remains reset. This condition remains until the count of counter 39 is incremented to a count of eight. At that time, flip-flop circuit 42 is set. Accordingly, the output produced by AND gate 45 is referred to herein as the enable signal $CT_{4-7}$, which means that this enable signal is produced while counter 39 is incremented from a count of four through a count of seven, inclusive.

The Q output of flip-flop circuit 42 is connected directly to an output terminal 48. Hence, a binary "1" is provided at this output terminal only when the count of counter 39 has been incremented to a count of eight. Thus, the output of terminal 48 is referred to herein as the enable signal $CT_8$.

Output terminals 46, 47 and 48 are connected to enable inputs 49, 50 and 51 of AND gates 31, 32 and 33, respectively. Consequently, when the count of counter 39 is incremented from a count of zero to a count of three, the enable signal $CT_{0-3}$ is produced, thus enabling AND gate 31 to supply interval defining pulses HNTWIND having a period equal to eight position pulses PG. When the count of counter 39 is incremented to a count of four, the enable signal $CT_{0-3}$ is terminated and the enable signal $CT_{4-7}$ is produced. Hence, AND gate 32 is enabled to produce the interval defining pulses HNTWIND having a period equal to sixteen position pulses PG. Then, when counter 39 is incremented to a count of eight, the enable signal $CT_{4-7}$ is terminated and the enable signal $CT_8$ is produced. At that time, AND gate 33 is enabled to produce the interval defining pulses HNTWIND having a period equal to sixteen position pulses.

Briefly, in operation, the reproduced video signal is amplified by amplifier 11 and sampled in sampling gate 12. The magnitude of the sampled video signal, which corresponds to the magnitude of the video signal which is reproduced during the central portion of the scanning trace of the magnetic head, is converted to a measurement pulse $P_L$ of corresponding duration. This measurement pulse conditions AND gate 21 to supply a number of counting pulses $P_c$ to counter 22, this number being determined by the duration of the measurement pulse.

Let it be assumed that the power supply of the VTR first is turned ON, and that the VTR is changed over to its playback mode. Accordingly, the system reset signal SYS RESET is produced to reset counter 30, included in interval defining pulse generator 27, and to reset counter 39, included in interval control circuit 40. In addition, the system valid signal SYS VALID is generated to enable AND gate 31 to supply direction determining signals to counter 39. As the VTR operates, position pulses PG are generated and counted by position pulse counter 30. Since counter 39 has been reset, enable signal $CT_{0-3}$ is produced to enable AND gate 31. Consequently, each time that eight position pulses PG have been counted, the AND gate generates an interval defining pulse HNTWIND. It is appreciated that the period of this interval defining pulse is equal to eight position pulses, and the pulse duration of the interval defining pulse is equal to the period of the position pulses, that is, the interval between successive position pulses.

If it is assumed that one position pulse PG is generated each time that two video tracks are scanned, then the interval defining pulse HNTWIND, derived from AND gate 31, is produced following each scanning of sixteen tracks.

After sixteen tracks have been scanned, the count accumulated in counter 22, which corresponds to the averaged signal strength of the reproduced video signals, is transferred to register 26. During the next interval defined by the interval defining pulse HNTWIND, the count of counter 22 again is incremented to provide a measurement of the averaged signal strength of the video signals which are reproduced during this interval. At the conclusion of this interval, comparator 24 is energized to compare the new count N in counter 22 to the former count F stored in register 26. Let it be assumed that the new count is less than the former count. Hence, comparator 24 produces a binary "1" output which triggers flip-flop circuit 37. When this flip-flop circuit changes state, the transition in the direction determining signal produced thereby is supplied through AND gate 38 to increment counter 39. It had been assumed that counter 39 was reset to a zero count and, therefore, now is incremented to a count of one. Consequently, the enable signal $CT_{0-3}$ is maintained.

During the next interval defined by the interval defining pulse HNTWIND derived from AND gate 31, the count of counter 22 is accumulated, thereby representing the averaged signal strength of the video signal which is reproduced during that interval. At the conclusion of the interval, the interval defining pulse HNTWIND is generated to energize comparator 24. Let it be assumed that the new count N now exceeds the former count F. Hence, the state of flip-flop circuit 37 is not changed. Thus, the count of counter 39 is not incremented.

The foregoing operation is repeated and, depending upon whether the new count N is greater or less than the former count F, the state of flip-flop circuit 37 is selectively changed in response to comparator 24. Each time that the state of this flip-flop circuit is changed, thus changing the direction in which the phase of the position pulse is shifted, as will be described, counter 39 is incremented. When counter 39 is incremented to a count of four, the enable signal $CT_{0-3}$ is terminated and the enable signal $CT_{4-7}$ is produced. Thus, AND gate 31 is disabled and AND gate 32 now is enabled. This changes the period of the interval defining pulses HNTWIND from a period corresponding to eight position pulses to a period corresponding to sixteen position pulses. Thus, the rate at which the new count N accumulated by counter 22 is compared to the former count F is reduced by a factor of one-half. The rate at which the direction determining signal is produced by flip-flop circuit 37 likewise is reduced. This means that the rate at which the position pulses are phase-shifted also is reduced. It should be appreciated that, by the time that counter 39 is incremented to a count of four, the scanning traces of the magnetic heads and the recorded video tracks are closer to proper alignment. Hence, the position pulses need not be phase-shifted as often as when there was a greater mis-alignment between the scanning traces and the record tracks.

The operation of signal strength measuring circuit 10, interval defining pulse generator 27 and interval control circuit 40 continues as described previously until eight reversals in the direction determining signal produced by flip-flop circuit 37 have been counted by counter 39. At that time, the enable signal $CT_{4-7}$ is terminated and the enable signal $CT_8$ is produced. Consequently, AND gate 33 is enabled while AND gate 32 is disabled. This means that the interval defining pulse HNTWIND is produced each time that thirty-two position pulses PG have been counted by position pulse counter 30. This results in a further reduction in the rate at which comparator 24 is energized, and the rate at which the direction determining signal can be reversed. Once counter 39 reaches the count of eight, and thereafter, counter 22 is incremented to provide a measurement of the signal strength of the reproduced video signal averaged over the interval defined by thirty-two position pulses, and this measurement is compared to the measurement of the signal strength which had been obtained during the preceding interval. As before, if the new count N exceeds the former count F, the state of flip-flop circuit 37 is not changed. As will be described below, this means that the position pulses are phase-shifted in the same direction at the beginning of the next interval as they had been at the beginning of the just-concluded interval. However, if the new count N is less than the former count F, the state of flip-flop circuit 37 is reversed so that, at the beginning of the next interval, the position pulses are phase-shifted in a direction which is opposite to the direction in which the position pulses were shifted at the beginning of the just-concluded interval.

Before describing the phase-shift circuitry which utilizes the direction determining signal produced by flip-flop circuit 37 and the enable signals $CT_{0-3}$, $CT_{4-7}$ and $CT_8$ to adjust, or shift, the phase of the position pulses so as to correct the tracking condition of the magnetic heads, reference is made to FIG. 6 which is a schematic diagram of one embodiment of level-to-width converter 13. This level-to-width converter is comprised of a transistor 132, biased to operate as a non-linear amplifier, a buffer transistor 133, an integrator 136, a reset transistor 137, and a comparator 140. The base of transistor 132 is connected to an input terminal 131 to receive the video signal which is reproduced by the magnetic heads MH. The collector electrode of transistor 132 is connected to the base of emitter-follower buffer transistor 133. The output of this buffer transistor is coupled through a diode 134 to an integrator formed of a resistor 135 and an integrating capacitor 136. The collector-emitter circuit of reset transistor 137 is connected in parallel with capacitor 136, the base of this transistor being connected to a terminal 139 for receiving a reset pulse.

Integrating capacitor 136 is connected to comparator 140 by an emitter-follower transistor 138. Comparator 140 may comprise a differential amplifier, an operational amplifier, or similar circuitry including an inverting input and a non-inverting input. The inverting input of comparator 140 is coupled to emitter-follower transistor 138. The non-inverting input of the comparator is connected to a source of reference potential +RB. The output of comparator 140 is connected to an output terminal 141.

The operation of the level-to-width converter shown in FIG. 6 will best be understood by reference to the waveform diagrams shown in FIGS. 7A–7F. Reference letters are provided at respective circuit locations in FIG. 6 to represent the signals which are shown in FIGS. 7A–7F. Thus, the video signal which is supplied to terminal 131 in FIG. 6 is as shown in FIG. 7B. This video signal is amplified by non-linear amplifying transistor 132 and then is supplied from the buffer emitter-follower transistor 133 to the integrator formed of resistor 135f and capacitor 136 as the waveform shown in FIG. 7C. Capacitor 136, which is discharged to a reference potential by transistor 137 in response to the reset pulse $P_r$ shown in FIG. 7D, thereafter is charged to the voltage shown in FIG. 7E. As this voltage increases across capacitor 136, it is compared to reference potential RB in comparator 140. It is recognized that, when capacitor 136 is discharged by reset transistor 137 at the beginning of the sampling pulse interval, that is, in response to the reset pulse $P_r$, the reference potential RB at the non-inverting input of comparator 140 exceeds the voltage across capacitor 136 which is supplied to the inverting input of the comparator. Hence, a relatively higher level potential is supplied to output terminal 141 by comparator 140. When capacitor 136 has been charged to a level which exceeds the reference potential RB, the voltage provided at the inverting input of comparator 140 exceeds the voltage at the non-inverting input thereof. Consequently, the output of the comparator undergoes a transition to its relatively lower level. The resultant measurement pulse $P_L$ which is supplied to terminal 141 by comparator 140 is shown in FIG. 7F.

It may be seen that the width t of the measurement pulse $P_L$ (FIG. 7F) is determined by the length of time required for capacitor 136 to be charged to the level corresponding to the reference potential RB. This charging time is a function of the magnitude of the amplified video signal shown in FIG. 7C. Thus, as the signal strength of the reproduced video signal varies, the length of time required for capacitor 136 to be charged to the level corresponding to reference potential RB likewise varies. Hence, comparator 140 produces the measurement pulse $P_L$ whose duration t is determined by the magnitude of the reproduced video signal. The level of this reproduced signal thus is converted to a pulse of corresponding duration.

Of course, the reproduced video signal is supplied to input terminal 131 only during the duration that gate 12 is opened in response to sampling pulse $P_s$. That is, the reproduced video signal is supplied to non-linear amplifier transistor 132 during the sampling pulse duration $T_s$, as shown in FIG. 7A. As can be seen from FIG. 7D, the reset pulse $P_r$ which is supplied to reset transistor 137 is generated in response to the leading edge, or positive transition, of the sampling pulse $P_s$. Reset generator 20, which generates this reset pulse, thus may comprise a differentiating circuit and, if desired, a monostable multivibrator which is triggered in response to the differentiation of the leading edge of the sampling pulse.

Figure 8:
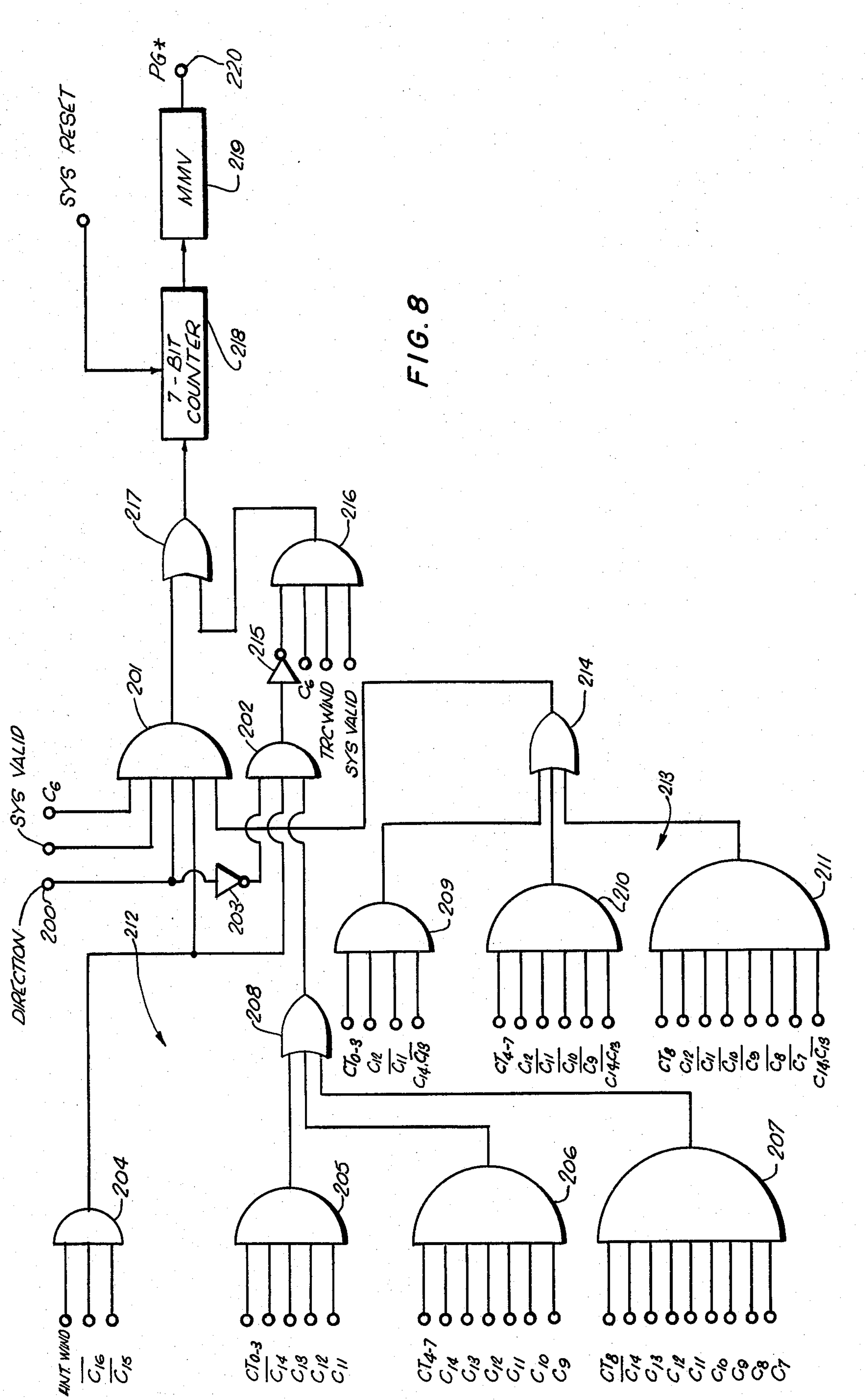
FIG. 8 is a logic diagram of a portion of the apparatus of the present invention.

FIG. 8 is a logic diagram of the circuitry which utilizes the direction determining signal produced by flip-flop circuit 37 and the enabling signals $CT_{0-3}$, $CT_{4-7}$ and $CT_8$ (FIG. 5) together with the timing pulses produced by oscillator 4 to synthesize and phase-shift position pulses PG*. The purpose of the circuitry shown in FIG. 8 is to generate a synthesized position pulse PG* at a location during the phase shift window TRCWIND (FIG. 4) which, at most, is delayed from the generated position pulse PG by 4.6 msec. Moreover, the synthesized position pulse PG* is phase adjusted during this phase shift window by an amount so as to establish the desired phase relation $\phi'$ between the position pulse and the control pulse CTL, as shown in FIG. 3C. The synthesized position pulses PG* have the same repetition rate as the generated position pulses PG. In the preferred embodiment, the phase of the synthesized position pulses PG* is adjusted once during each interval defined by the interval defining pulses HNTWIND by an amount which is related to the length of time that the VTR has been in operation. Also, the direction in which the phase of the synthesized position pulse PG* is adjusted is determined as a function of whether the signal strength of the video signals which are reproduced during a just-concluded interval is greater or less than the signal strength of the video signals which had been reproduced during the immediately preceding inverval.

Referring specifically to FIG. 8, the illustrated circuitry is comprised of a selector circuit formed of AND gates 201 and 202, a source of clock pulses $C_6$, a clock pulse counter 218, a clock pulse deleting circuit 212 and a clock pulse adding circuit 213. The source of clock pulses may comprise, for example, oscillator 4 which generates clock pulses $C_6$. These clock pulses are supplied to AND gate 216 together with the system valid signal SYS VALID and a phase shift window pulse TRCWIND. In addition, an inhibit signal is adapted to be supplied to AND gate 216 via AND gate 202 included in the selector circuit and an inverter 215. The output of AND gate 216, which comprises a burst of clock pulses $C_6$ generated during each phase shift window TRCWIND (FIG. 4) is coupled to clock pulse counter 218 via an OR gate 217. The clock pulse counter may comprise a conventional 7-bit digital counter including a reset terminal connected to receive the system reset signal SYS RESET. An output is produced by clock pulse counter 218 whenever a predetermined count is reached thereby. This output is used to trigger a monostable multivibrator 219 which is connected to output terminal 220. As will be described, when monostable multivibrator 219 is triggered, a synthesized position pulse PG* is generated thereby.

AND gates 201 and 202 comprising the selector circuit are adapted to enable either a pulse adding operation, whereby additional clock pulses are added to the count of clock pulse counter 218, or a pulse deleting operation whereby selected ones of the clock pulses supplied to the clock pulse counter by AND gate 216 are deleted. To this effect, AND gate 201 is connected directly to an input terminal 200 for receiving the direction determining signal produced by flip-flop circuit 37. This AND gate also is connected to receive the system valid signal SYS VALID and the clock pulses $C_6$ produced by oscillator 4. Another input of AND gate 201 is connected to an AND gate 204 which is adapted to generate an enabling pulse during a predetermined portion of each interval defining pulse HNTWIND. Yet another input of AND gate 201 is connected to the clock pulse adding circuit 213 so as to be enabled for a selective duration for transmitting clock pulses $C_6$ to clock pulse counter 218 via OR gate 217.

AND gate 202 includes an input coupled through an inverter 203 to receive the direction determining signal produced by flip-flop circuit 37. It is, therefore, appreciated that AND gates 201 and 202 are mutually exclusively operated, depending upon the state of flip-flop circuit 37 and, thus, the sense of the direction determining signal. Another input of AND gate 202 is connected in common with an input of AND gate 201 to AND gate 204. Yet another input of AND gate 202 is connected to clock pulse deleting circuit 212 to receive an enabling signal therefrom of selected duration. The output of AND gate 202 is connected through inverter 215 to AND gate 216. As will be described, when AND gate 202 is activated to produce a binary "1", AND gate 216 is inhibited for the duration of this binary "1" to delete a corresponding number of clock pulses $C_6$ from being supplied to clock pulse counter 218.

AND gate 204 includes respective inputs connected to receive the interval defining pulse HNTWIND, and timing pulses $\overline{C}_{16}$ and $\overline{C}_{15}$. From the timing waveforms shown in FIG. 4, it is appreciated that AND gate 204 is activated during the 9 msec interval that timing pulse $C_{15}$ is at its relatively lower level and timing pulse $C_{16}$ also is at its relatively lower level during each interval defining pulse HNTWIND, the latter being derived at the output of OR gate 35, discussed previously with respect to FIG. 5.

Clock pulse deleting circuit 212 is comprised of AND gates 205, 206 and 207 whose outputs are connected to respective inputs of an OR gate 208, the latter being connected to AND gate 202. AND gate 205 includes an input connected to receive the enabling signal $CT_{0-3}$, and additional inputs connected to receive timing pulses $\overline{C}_{14}$, $C_{13}$, $C_{12}$ and $C_{11}$. By referring to the timing waveforms shown in FIG. 4, it may be appreciated that AND gate 205 is adapted to generate an inhibit signal having a duration corresponding to sixteen $C_6$ clock pulses. AND gate 206 includes an input connected to receive the enabling signal $CT_{4-7}$, and additional inputs connected to receive timing pulses $C_9$, $C_{10}$, $C_{11}$, $C_{12}$, $C_{13}$ and $C_{14}$. From the timing waveforms shown in FIG. 4, it can be appreciated that AND gate 206 is operative to produce an inhibit pulse of duration corresponding to four $C_6$ clock pulses. The output of AND gate 206 is coupled via OR gate 208 to AND gate 202. AND gate 207 includes in input connected to receive the enabling signal $CT_8$, together with additional inputs connected to receive timing pulses $C_7 \ldots C_{13}$ and $\overline{C}_{14}$. The timing waveforms shown in FIG. 4 indicate that AND gate 207 is adapted to produce an inhibit pulse of duration equal to one $C_6$ pulse period. The output of this AND gate also is connected via OR gate 208 to AND gate 202.

Although the inhibit pulses which are selectively produced by clock pulses deleting circuit 212 are generated periodically during each interval separating successive position pulses PG, these inhibit pulses are effective to delete clock pulses $C_6$ only during the intervals that AND gate 202 is actuated. These intervals are determined by AND gate 204 and are seen to be approximately the first quarter of each interval defining pulse HNTWIND.

Clock pulse adding circuit 213 is comprised of AND gates 209, 210 and 211, the outputs of which are connected via an OR gate 214 to AND gate 201. AND gate 209 includes an input connected to receive the enabling signal $CT_{0-3}$. Additional inputs of this AND gate are connected to receive timing pulses $\overline{C}_{11}$, $C_{12}$, $\overline{C}_{13}$ and $C_{14}$. The timing waveforms shown in FIG. 4 indicate that AND gate 209 produces an output pulse of duration equal to the period of sixteen $C_6$ clock pulses, and this output pulse is generated when timing pulse $C_{14}$ is at its relatively higher level, that is, following the phase shift window TRCWIND. AND gate 210 includes an input connected to receive the enabling signal $CT_{4-7}$ and additional inputs connected to receive the timing pulses $\overline{C_9}$, $\overline{C_{10}}$, $\overline{C_{11}}$, $C_{12}$, $\overline{C_{13}}$ and $C_{14}$. The timing waveforms shown in FIG. 4 indicate that AND gate 210 is operative to produce an output pulse of duration equal to the period of four $C_6$ clock pulses, this output pulse being generated at a time following the phase shift window TRCWIND. AND gate 211 includes an input connected to receive the enabling signal $CT_8$, together with additional inputs connected to receive the timing pulses $\overline{C_7}$, $\overline{C_8}$, $\overline{C_9}$, $\overline{C_{10}}$, $\overline{C_{11}}$, $\overline{C_{12}}$, $\overline{C_{13}}$ and $C_{14}$. The timing waveforms shown in FIG. 4 indicate that AND gate 211 is operative to produce an output pulse of duration equal to the period of one $C_6$ clock pulse. This output pulse is generated at a time following the phase shift window TRCWIND.

The manner in which the circuitry shown in FIG. 8 operates now will be described with reference to the waveforms shown in FIGS. 9A–9AA; the overall operation of the circuitry shown in FIG. 8 in combination with the circuitry shown in FIG. 5 is described below with respect to the waveforms shown in FIGS. 10A–10E and the diagrammatric representation of FIG. 11. FIGS. 9A–9K are waveform diagrams of clock pulses $C_6$ and timing pulses $C_7 \ldots C_{16}$, respectively. It is appreciated that these waveforms have been shown previously in FIG. 4. FIG. 9L shows the phase shift window TRCWIND which is generated by an AND gate supplied with timing pulses $\overline{C_{14}}$, $\overline{C_{15}}$ and $\overline{C_{16}}$.

Let it be assumed that the VTR power supply is energized, or that a new recording medium is loaded therein such that the system reset signal SYS RESET is generated. This system reset signal is supplied to clock pulse counter 218 to reset this counter to a predetermined count. This count is assumed herein to be equal to 1000000. It is appreciated that a 7-bit digital counter is adapted to count 128 clock pulses. It is further appreciated that the count 1000000 corresponds to a count of sixty-four. Hence, when clock pulse counter 218 counts sixty-four clock pulses $C_6$, the most significant bit (MSB) thereof, which had been preset to a binary "1", is changed over to a binary "0". This most significant bit is changed over once again to a binary "1" after clock pulse counter 218 counts another sixty-four clock pulses. Thus, the most significant bit of the count of the clock pulse counter undergoes a transition in response to the counting of each sixty-four clock pulses.

If clock pulse deleting circuit 212 and clock pulse adding circuit 2131 are not considered, then AND gate 216 is seen to supply clock pulses $C_6$ during each phase shift window TRCWIND, shown in FIG. 9L. Since the most significant bit of clock pulse counter 218 has been set to a binary "1", it is appreciated that this most significant bit undergoes a negative transition after sixty-four clock pulses $C_6$ have been supplied thereto. This negative transition is shown in FIG. 9M. Hence, since monostable multivibrator 219 is triggered in response to a negative transition, the monostable multivibrator generates a synthesized position pulse PG*, shown in FIG. 9U. The generated position pulse PG is shown in FIG. 9T. A comparison of FIGS. 9T and 9U indicates that the synthesized position pulse PG* is phase-shifted by an amount corresponding to sixty-four clock pulses $C_6$, or approximately 2.3 msec, from the generated position pulse. It is also seen that the repetition rate of the synthesized position pulses PG* is equal to the repetition rate of the generated position pulses PG.

After the most significant bit of clock pulse counter 218 undergoes a negative transition, the next sixty-four clock pulses $C_6$ supplied to the counter during the remainder of the phase shift window TRCWIND results in a positive transition in this most significant bit, as shown in FIG. 9M. At the termination of the phase shift window, AND gate 216 is disabled, and clock pulses $C_6$ no longer are supplied thereby to the clock pulse counter. Hence, the most significant bit of this counter does not undergo another transition until the next following phase shift window which, as shown in FIG. 9L, occurs at the repetition rate of the generated position pulses PG.

If the count of clock pulse counter 218 is incremented at sometime prior to the generation of the phase shift window TRCWIND, then it is appreciated that the number of clock pulses $C_6$ which must be supplied thereto in order to produce a negative transition in the most significant bit is reduced by a corresponding amount. Clock pulse adding circuit 213 performs this function. Let it be assumed that the direction determining signal produced by flip-flop circuit 37 is at a relatively high level. This enables AND gate 201 while disabling AND gate 202. Depending upon which of AND gates 209, 210 and 211 is actuated, AND gate 201 supplies one, four or sixteen clock pulses $C_6$ to clock pulse counter 218 when AND gate 204 supplies a binary "1" thereto. During the first quarter of the interval defining pulse HNTWIND, timing pulses $C_{15}$ and $C_{16}$ both exhibit their relatively lower levels, thereby supplying a binary "1" from AND gate 204 to AND gate 201. It is recalled that the interval defining pulse HNTWIND has a duration equal to the period of the generated position pulses PG and, moreover, is produced at a rate of one interval defining pulse for each n position pulses, wherein n is equal to eight, sixteen or thirty-two in the embodiment shown in FIG. 5. Thus, the effect of clock pulse adding circuit 213 is present during approximately one-fourth of a position pulse period for each eight, sixteen or thirty-two position pulses.

When the enabling signal $CT_{0-3}$ is generated, that is, when less than four phase shift direction reversals have occurred, AND gate 209 is actuated to supply a pulse to AND gate 201 having a duration equal to sixteen clock pulses $C_6$. This pulse is produced when timing pulse $C_{13}$ is at its relatively lower level and timing pulse $C_{14}$ is at its relatively higher level immediately following the termination of the phase shift window TRCWIND. Thus, AND gate 201 is enabled to supply sixteen clock pulses $C_6$ to increment the count of clock pulse counter 218 by sixteen following the completion of the phase shift window.

Let it be assumed that when the phase shift window had terminated, the count of clock pulse counter 218 had been equal to sixty-four. Now, the count thereof is incremented so as to be equal to a count of eighty. During the next following phase shift window TRCWIND, AND gate 216 is enabled to supply clock pulses $C_6$ to clock pulse counter 218. Only forty-eight clock pulses now are needed until the most significant bit of this counter undergoes its negative transition, as shown in FIG. 9N. Thus, monostable multivibrator 219 is triggered to generate a phase-shifted synthesized position pulse $PG^*_A$, as shown in FIG. 9V. A comparison of FIGS. 9U and 9V indicates that the synthesized position pulse $PG^*_A$ undergoes a negative phase shift by an amount corresponding to sixteen clock pulses $C_6$.

If the enable signal $CT_{4-7}$ had been produced in place of enable signal $CT_{0-3}$, it is seen than AND gate 210 would have been actuated. Consequently, this AND gate will supply a pulse of duration corresponding to the period of four clock pulses $C_6$ to AND gate 201 at a time following the termination of the phase shift window TRCWIND. This means that, during the interval defining pulse HNTWIND when AND gate 201 is enabled, four clock pulses $C_6$ are supplied therefrom to clock pulse counter 218. This presets the count of the clock pulse counter to a count of sixty-eight prior to the occurrence of the next phase shift window. Hence, during the next phase shift window when AND gate 216 supplies clock pulses $C_6$ to counter 218, only sixty clock pulses are needed to increment the count of this counter to a count of 128, whereupon the most significant bit thereof undergoes its negative transition. This is shown in FIG. 9O. The negative transition of the most significant bit in clock pulse counter 218 triggers monostable multivibrator 219 to generate the phase-shifted synthesized position pulse $PG^*_B$, shown in FIG. 9W. A comparison of FIGS. 9U and 9W indicates that the synthesized position pulse PG* undergoes a negative phase shift in response to the operation of AND gate 210, this negative phase shift corresponding to four clock pulses $C_6$.

If the enable signal $CT_8$ had been produced, it is seen that AND gate 211 would have been actuated to supply a pulse to AND gate 201 having a duration equal to the period of one clock pulse $C_6$. Thus, during the occurrence of the interval defining pulse HNTWIND, AND gate 201 will be actuated to supply one clock pulse $C_6$ to preset the count of clock pulse counter 218 to a count of 65. Then, during the next phase shift window TRCWIND, only sixty-three clock pulses $C_6$ need be supplied to the counter by AND gate 216 to increment the count thereof such that the most significant bit undergoes a negative transition. This negative transition, shown in FIG. 9P, triggers monostable multivibrator 219 to generate the phase-shifted synthesized position pulse $PG^*_C$. A comparison between FIGS. 9U and 9X indicates that, when AND gate 211 is actuated, the position pulse PG* is phase-shifted in the negative direction by an amount corresponding to the period of one clock pulse $C_6$.

Let it be assumed that the state of the direction determining signal produced by flip-flop circuit 37 is relatively low. Consequently, AND gate 201 is disabled but AND gate 202 now is enabled. This AND gate is actuated during the first quarter of each interval defining pulse HNTWIND so as to respond to clock pulse deleting circuit 212. Let it be assumed that the enable signal $CT_{0-3}$ is produced. Accordingly, AND gate 205 generates an output pulse during the phase shift window TRCWIND having a duration equal to sixteen clock pulses $C_6$. This pulse is transmitted through conditioned AND gate 202 and inverted by inverter 215 to inhibit the operation of AND gate 216 for this period. Consequently, sixteen clock pulses $C_6$ are inhibited from being supplied to clock pulse counter 218 during the phase shift window TRCWIND. If the initial count in counter 218 has been equal to sixty-four, then, by inhibiting AND gate 216, sixteen clock pulses are prevented from being supplied to this counter. Consequently, the incrementing of the count of clock pulse counter 218 to a count of 128 is delayed by an interval equal to this period of sixteen clock pulses $C_6$. This means that the most significant bit of the clock pulse counter undergoes a negative transition at a time delayed by sixteen clock pulses $C_6$, as shown in FIG. 9Q. This negative transition triggers monostable multivibrator 219 to generate the phase-shifted synthesized position pulse $PG^*_A{}'$. A comparison between FIGS. 9U and 9Y indicates that, when AND gates 205 and 202 are actuated, the synthesized position pulse $PG^*_A{}'$ is shifted in a positive direction, or phase delayed, by an amount equal to the period of sixteen clock pulses $C_6$.

Of course, at the termination of the phase shift window TRCWIND, the count of clock pulse counter 218 will have been incremented from a count of zero to a count of forty-eight, as shown in FIG. 9Q. This means that, during the next phase shift window, sixteen clock pulses $C_6$ must be supplied to the counter before the most significant bit thereof undergoes its positive transition. Then, the next sixty-four clock pulses, all of which are supplied to clock pulse counter 218, results in a negative transition in this most significant bit. Hence, during subsequent phase shift windows TRCWIND, and prior to the occurrence of the next interval defining pulse HNTWIND, the negative transition in the most significant bit of counter 218 occurs at a phase-delayed time, thus producing the phase-shifted synthesized position pulse $PG^*_A{}'$.

If, instead of enable signal $CT_{0-3}$, the enable signal $CT_{4-7}$ had been produced, then AND gate 206 will be actuated. This AND gate supplies a pulse of duration corresponding to the period of four clock pulses $C_6$ to AND gate 202. When AND gate 202 is conditioned, this pulse inhibits the operation of AND gate 216 for a duration equal to four clock pulses. Hence, the negative transition in the most significant bit of counter 218 now occurs at a phase-delayed time corresponding to four clock pulses $C_6$, as shown in FIG. 9R. Monostable multivibrator 219 is triggered in response to this negative transition, resulting in the phase-shifted synthesized position pulse $PG^*_B{}'$ shown in FIG. 9Z. A comparison of FIGS. 9U and 9Z indicates that, when AND gate 206 is operated and AND gate 202 is conditioned, the synthesized position pulse $PG^*_B{}'$ is phase-shifted in a positive direction, that is, it is phase-delayed, by an amount equal to four clock pulses $C_6$.

If the enable signal $CT_8$ had been produced in place of the enable signals $CT_{0-3}$ or $CT_{4-7}$, AND gate 207 will produce an output pulse whose duration is equal to the period of one clock pulse $C_6$. This pulse is supplied through conditioned AND gate 202 to inhibit AND gate 216 for a corresponding duration. Hence, one clock pulse is deleted from being supplied to clock pulse counter 218. As a consequence thereof, the most significant bit of counter 218 undergoes its negative transition at a time delayed by one clock pulse, as shown in FIG. 9S. This negative transition triggers monostable multivibrator to generate the phase-shifted synthesized pulse $PG^*_C{}'$, shown in FIG. 9AA. A comparison of FIGS. 9U and 9AA indicates that when AND gate 207 is actuated and when AND gate 202 is conditioned, the synthesized position pulse $PG^*_C{}'$ is phase-delayed by an amount equal to one clock pulse period.

The overall operation of the circuitry shown in FIGS. 5 and 8 now will be described with reference to the waveforms shown in FIGS. 10A–10E and the diagrammatic representation of FIG. 11. FIG. 10A illustrates the position pulses PG which are generated by, for example, position pulse generator PGA (FIG. 1C). These position pulses PG are counted by position pulse counter 30. It is assumed that the number of reversals in the direction in which the synthesized position pulse PG* is shifted is less than four. That is, it is assumed that the count of counter 39 is between zero and three; and, therefore, that the enable signal $CT_{0-3}$ is produced and supplied to AND gate 31. This means that interval defining pulse generator 27 generates the interval defining pulse HNTWIND for each eight position pulses PG counted by position pulse counter 30. FIG. 10B represents these periodic interval defining pulses HNTWIND. It is seen that the period of these interval defining pulses is equal to eight position pulses; and that the duration of each interval defining pulse is equal to the period of the position pulses (i.e., the interval between adjacent position pulses). Let it be assumed that, upon the occurrence of the first interval defining pulse HNTWIND shown in FIG. 10B, the present count N accumulated in counter 22 is equal to a count of one hundred, while the former count F is equal to a count of 102. It is appreciated that the present count N represents the signal strength of the video signals reproduced during the just-concluded interval, that is, the interval concluding with interval defining pulse HNTWIND, and the former count F represents the strength of the video signals which had been reproduced during the immediately preceding interval. Since the present count is less than the former count (N<F), comparator 24 supplies a binary "1" to trigger flip-flop circuit 37. FIGS. 10C and 10D represent the counts stored in counter 22 and register 26, respectively; and FIG. 10E represents the sense of the direction determining signal produced by flip-flop circuit 37. It is seen that when comparator 24 is energized in response to the interval defining pulse HNTWIND, flip-flop circuit 37 is triggered to produce, for example, a binary "1".

When flip-flop circuit 37 changes state, this transition in the output thereof increments the count of counter 39. Furthermore, when the sense of the direction determining signal is a binary "1", AND gate 201 (FIG. 8) is enabled, thereby enabling the operation of clock pulse adding circuit 213. In particular, during the first quarter of the second interval defining pulse HNTWIND, represented by the shaded portion of the second interval defining pulse shown in FIG. 10B, the output of AND gate 204 is a binary "1" to condition AND gate 201 to supply the number of clock pulses $C_6$ to clock pulse counter 218, as determined by clock pulse adding circuit 213. Since it has been assumed that the enable signal $CT_{0-3}$ is produced, the conditioning of AND gate 201 by AND gate 204 is effective to supply sixteen clock pulses $C_6$, as determined by the operation of AND gate 209, to the clock pulse counter. It is seen, from FIGS. 9J and 9K, that AND gate 204 produces a conditioning pulse during the first quarter of an interval defining pulse HNTWIND, this conditioning pulse having a duration that is approximately twice the duration of the phase shift window TRCWIND, shown in FIG. 9L. Since AND gate 209 is energized during the duration of this conditioning pulse, but following the phase shift window TRCWIND, it is appreciated that AND gate 201 supplies the clock pulses $C_6$ to clock pulse counter 218 at a time that is outside the phase shift window.

It is recognized that, in response to the operation of clock pulse adding circuit 213 during the shaded portion of the second interval defining pulse HNTWIND (FIG. 10B), the phase of the synthesized position pulse PG* is advanced, that is, phase-shifted in the negative direction, as shown in FIG. 9V. This phase shift in the synthesized position pulses PG* adjusts the tracking condition of the magnetic heads MH relative to the video tracks VST. Let it be assumed that this negative shift in the phase of the synthesized position pulses PG* brings the scanning traces of the magnetic heads into closer alignment with the video tracks, as represented by scanning cycle 2 in FIG. 11. FIG. 11 represents that the tracking condition of the heads during the first interval defining pulse HNTWIND is to the right of the proper tracking condition, and that this tracking condition is adjusted at the second interval defining pulse.

FIG. 10D represents that upon the occurrence of the second interval defining pulse, the count accumulated in counter 22 is equal to a count of 102. It is recalled that the count previously accumulated by this counter had been equal to 100. Thus, comparator 24 now senses that the new count N exceeds the former count F, thus representing that the strength of the video signals reproduced during the just-concluded interval is greater than the signal strength of the video signals which had been reproduced during the immediately preceding interval. Comparator 24, although energized by the interval defining pulse HNTWIND, now produces a binary "0" which does not reverse the state of flip-flop circuit 37. This is represented in FIG. 10E. Consequently, AND gate 201 remains energized so as to enable another operation of clock pulse adding circuit 213. Thus, upon the occurrence of the third interval defining pulse, the synthesized position pulses PG* are phase advanced by another increment determined by the output of AND gate 209. It is appreciated that this shift in the phase of the synthesized position pulses now shifts the tracking condition of the magnetic heads beyond the proper tracking condition thereof and into a relatively small mis-alignment, as shown by the third cycle in FIG. 11.

Upon the occurrence of the third interval defining pulse HNTWIND, the new count N in counter 22 is less than the former count F stored in register 26. Consequently, comparator 24 produces a binary "1" to reverse the state of flip-flop circuit 37, as shown in FIG. 10E. This reversal in the state of the flip-flop circuit now disables AND gate 201 and enables AND gate 202. Hence, when AND gate 204 produces its next conditioning pulse, AND gate 202 enables a clock pulse deleting operation. That is, when AND gate 202 is conditioned, the inhibit pulse which is produced by AND gate 205 in clock pulse deleting circuit 212 is transmitted through AND gate 202 and inverted by inverter 215 to inhibit AND gate 216 from supplying a corresponding number of clock pulses $C_6$ to clock pulse counter 218. From FIG. 9Q, it is seen that this clock pulse deleting operation shifts the time in which the most significant bit of the clock pulse counter undergoes its negative transition. Thus, and as shown in FIG. 9Y, the synthesized position pulses PG* are phase delayed by an increment corresponding to the inhibit pulse duration produced by AND gate 205.

From FIG. 11, it is seen that this change in the direction of the phase shift of the synthesized position pulses PG* tends to correct the tracking condition of the magnetic heads. Hence, upon the occurrence of the fourth interval defining pulse HNTWIND, the new count N in counter 22 exceeds the former count F in register 26. Comparator 24 thus generates a binary "0" which does not reverse the state of flip-flop circuit 37. Hence, the aforedescribed clock pulse deleting operation is repeated during the next interval defining pulse. This means that another positive phase shift, or phase delay, is imparted to the synthesized position pulses PG*, resulting in a further shift in the tracking condition of the magnetic heads beyond the optimum tracking condition thereof.

From the foregoing, it is appreciated that the synthesized position pulses PG* are phase-shifted at each interval defining pulse. Once shifted, the phase of the synthesized position pulses remains at this fixed, phase-shifted amount, until the next interval defining pulse is produced. Furthermore, the direction in which the synthesized position pulses are phase shifted is determined by the relative strength of the video signals which are reproduced during the just-concluded interval defined by the interval defining pulse HNTWIND. When the tracking condition of the magnetic heads approaches the optimum tracking condition thereof, this direction of phase shift of the synthesized position pulses is reversed at alternate interval defining pulses. Consequently, the scanning traces of the magnetic heads are adjusted so as to be brought from a slight mis-alignment to one side of the video tracks into proper alignment therewith and then into a slight mis-alignment at the other side of the video tracks. This results in a reversal in the direction of the phase shift of the synthesized position pulses PG*, thereby bringing the scanning traces of the magnetic heads into proper alignment with the video tracks and then, during the next interval defined by the interval defining pulses HNTWIND, into slight mis-alignment at the other side of the video tracks.

From FIGS. 10A–10E, it is seen that the frequency at which the state of flip-flop circuit 37 reverses is determined by the frequency of the interval defining pulses HNTWIND. When a playback operation commences, the count in counter 39 is within a lower range so as to establish a higher frequency for the interval defining pulses. This means that a detecting cycle wherein the new count N of counter 22 is compared to the former count stored in register 26 is repeated at a relatively higher rate. That is, the synthesized position pulses PG* are phase-shifted at a higher repetition rate in an effort to bring the scanning traces of the magnetic heads rapidly into alignment with the video tracks.

As the playback operation continues, the count of counter 39 increases. When this count reaches an intermediate range, the repetition rate of the interval defining pulses HNTWIND is reduced. This, in turn, reduces the rate at which the detecting cycle is repeated. It should be recognized that, when the count of counter 39 reaches this intermediate range, the scanning traces of the magnetic heads are in close approximation to the proper alignment thereof and, hence, it is not necessary to adjust this tracking condition at a high repetition rate.

When the playback operation has been performed for a sufficiently long time such that the count of counter 39 reaches its higher range, the repetition rate of the interval defining pulses HNTWIND is reduced still further. This further reduces the rate at which the detecting cycle is repeated.

Also, clock pulse deleting circuit 212 and clock pulse adding circuit 213 function to effect a phase shift in the synthesized position pulses PG* of a phase-shift increment related to the count of counter 39. That is, when the count of this counter is in its relatively lower range, thus representing that the playback operation has been selected for a relatively short time, the phase-shift increment is relatively high, for example, corresponding to a period equal to sixteen clock pulses. This results in a relatively large adjustment to the tracking condition. As the count of counter 39 increases, the phase-shift increment decreases until the minimum, or basic, increment equal to a period of one clock pulse is imparted to the synthesized position pulses.

It is, of course, appreciated that the state of flip-flop circuit 37 does not change until the scanning traces of the magnetic heads have been adjusted so as to cross over the optimum alignment thereof with the video tracks. For example, if the tracking condition of the magnetic heads initially is far to one side of the video tracks, then during each of successive detecting cycles, the new count N will exceed the former count F as this tracking condition is adjusted so as to bring the scanning traces of the magnetic heads into proper alignment with the video tracks. But the state of flip-flop circuit 37 will not be changed until these scanning traces cross over the video tracks into slight mis-alignment on the other side thereof. Thus, the direction of the phase shift imparted to the synthesized position pulses is not changed until the proper alignment of the magnetic heads has been reached and then passed over.

While the present invention has been particularly shown and described with reference to a preferred embodiment thereof, it should be readily apparent to those of ordinary skill in the art that various changes and modifications in form and details may be made without departing from the spirit and scope of the invention. For example, position pulses PG shown in FIGS. 4 and 9T need not be generated solely by position pulse generator PGA. These position pulses can be generated by position pulse generators PGA and PGB, alternately. Such position pulses would exhibit a repetition rate of 60 Hz. Furthermore, it is recognized that the frequency of counting pulses $P_c$ which are counted by counter 22 during the duration of each measurement pulse $P_L$ determines the accuracy of the count of this counter. Hence, the frequency of counting pulses $P_c$ provides an accuracy of the measured signal strength of the reproduced video signals. Depending upon the desired accuracy, these counting pulses should have a corresponding frequency. Also, since the count of counter 22 is accumulated over a number of scanning traces of the magnetic heads, this count represents an averaged measured signal strength. This average measurement is preferred so as to smooth out aberrations that might be present in the reproduced video signal during isolated scanning cycles. Of course, it is possible that the contents of counter 22 may represent the signal strength of the video signal which is reproduced during only one scanning pass of the magnetic heads; and comparator 24 may function to sense the difference between the strength of the video signal which is reproduced during two successive scanning traces. Still further, interval defining pulse generator 27 is illustrated as being capable of generating interval defining pulses of three separate frequencies. It should be appreciated that, if desired, additional frequencies can be provided merely by using additional AND gates connected to different combinations of the counter outputs of position pulse counter 30. These AND gates can be selectively energized by additional enable signals which, in turn, can be produced as a function of different counts in counter 39.

Similarly, clock pulse deleting circuit 212 and clock pulse adding circuit 213 may be provided with additional AND gates, each being responsive to a different enable signal, to establish different phase-shift increments by which the synthesized position pulses PG* are phase-shifted. Also, although the recording medium has been described herein as a magnetic tape, it should be appreciated that any other recording medium, such as a magnetic sheet or an optical recording medium, can be used in place thereof. It is intended that the appended claims be interpreted as including the foregoing as well as various other such changes and modifications.

What is claimed is:

1. In a servo control system of the type adapted to control the tracking of at least one rotary signal transducer which scans successive parallel tracks on a movable record medium and including position pulse generating means for generating position pulses when said at least one transducer rotates into predetermined position with respect to said record medium, means for generating control signals representative of the relative positions of said tracks on said record medium, and control means for controlling the relative position of said at least one transducer with respect to the tracks scanned thereby as a function of said position pulses and said control signals, the improvement comprising detecting means for detecting relative strengths of signals reproduced from said tracks by said at least one transducer; phase shift means for shifting the phase of said position pulses by a selected amount during successive scanning cycles of said at least one transducer; means for periodically adjusting said selected amount by which the phase of said position pulses is shifted in accordance with the detected relative strengths of said reproduced signals; and means for supplying the phase shifted position pulses to said control means for use in controlling said relative position of said at least one transducer with respect to the tracks scanned thereby.

2. The servo control system of claim 1 wherein said means for periodically adjusting said selected amount by which the phase of said position pulses is shifted includes direction control means for reversing the direction in which the phase of said position pulses is shifted during a predetermined interval relative to the phase shift of said position pulses during a just-concluded interval if the relative strength of said signals reproduced during said just-concluded interval is less than the relative strength of said signals reproduced during the immediately preceding interval.

3. The servo control system of claim 2 wherein said phase shift means comprises window pulse generating means for generating a window pulse when said at least one transducer rotates into a preselected position with respect to said record medium; a source of timing pulses; counter means for counting said timing pulses during the duration of said window pulse to produce an output when a predetermined number of timing pulses have been counted; and means responsive to said output to derive a phase shifted version of said position pulse.

4. The servo control system of claim 3 further comprising second counter means for counting said generated position pulses to define said predetermined interval equal to the interval of N position pulses, wherein N is an integer.

5. The servo control system of claim 4 further comprising third counter means for counting the number of reversals of direction in which the phase of said position pulses is shifted; means for generating a first determining signal when the count of said third counter means is within a first range, a second determining signal when the count of said third counter means is within a second range, and a third determining signal when the count of said third counter means is within a third range; and means for establishing N as a function of the generated determining signal so as to correspondingly establish the duration of said predetermined interval.

6. The servo control sytem of claim 5 further comprising three gating means coupled to said second counter means for generating first, second and third periodic pulses, respectively, when said second counter means counts $N_1$, $N_2$ and $N_3$ position pulses, respectively, $N_1$, $N_2$ and $N_3$ being integers, a first of said gating means being conditioned by said first determining signal to generate said first periodic pulses having a period determined by $N_1$ position pulses, a second of said gating means being conditioned by said second determining signal to generate said second periodic pulses having a period determined by $N_2$ position pulses, and a third of said gating means being conditioned by said third determining signal to generate said third periodic pulses having a period determined by $N_3$ position pulses.

7. The servo control system of claim 6 wherein said detecting means comprises sampling means for sampling the signals reproduced from said tracks by said at least one transducer; converting means for converting the level of the sampled signals to a corresponding pulse width; measuring means for measuring each converted pulse width and for accumulating a digital count during each period of the generated periodic pulses representing accumulated pulse width measurements; temporary storage means for storing the digital count accumulated during the preceding period of said generated periodic pulses; and comparator means for comparing at the end of each period the digital count accumulated during said period to the stored digital count, said direction control means being operated by said comparator means.

8. The servo control system of claim 7 wherein said direction control means includes bistate means triggerable between first and second states when said stored digital count exceeds said accumulated digital count.

9. The servo control system of claim 8 wherein said means for periodically adjusting the selected amount by which the phase of said position pulses is shifted further includes timing pulse adding means operative to increase the number of timing pulses supplied to said first counter means such that said first counter means produces said output at a relatively advanced phase position during said window pulse duration; timing pulse deleting means operative to selectively delete timing pulses supplied to said first counter means such that said first counter means produces said output at a relatively delayed phase position during said window pulse duration; and selector means responsive to the first state of said bistate means to enable the operation of said timing pulse adding means and responsive to the second state of said bistate means to enable the operation of said timing pulse deleting means.

10. The servo control system of claim 9 further comprising means for energizing said selector means during a predetermined portion of said generated periodic pulses.

11. The servo control system of claim 10 wherein said timing pulse adding means comprises a first gate circuit responsive to said first determining signal for supplying a first number of timing pulses to said first counter means following the termination of said window pulse so as to preset said first counter means with said first number; a second gate circuit responsive to said second determining signal for supplying a second number of timing pulses to said first counter means following the termination of said window pulse so as to preset said first counter means with said second number, said second number being less than said first number; and a third gate circuit responsive to said third determining signal for supplying a third number of timing pulses to said first counter means following the termination of said window pulse so as to preset said first counter means with said third number, said third number being less than said second number.

12. The servo control system of claim 10 wherein said timing pulse deleting means comprises a first gate circuit responsive to said first determining signal for supplying a first inhibit pulse to inhibit a first number of timing pulses from being supplied to said first counter means during said window pulse so as to delay the output produced by said first counter means; a second gate circuit responsive to said second determining signal for supplying a second inhibit pulse to inhibit a second number of timing pulses from being supplied to said first counter means during said window pulse so as to delay the output produced by said first counter means, said second number being less than said first number; and a third gate circuit responsive to said third determining signal for supplying a third inhibit pulse to inhibit a third number of timing pulses from being supplied to said first counter means during said window pulse so as to delay the output produced by said first counter means, said third number being less than said second number.

13. The servo control system of claim 11 or 12 wherein $N_1 < N_2 < N_3$.

14. In a servo control system for controlling the tracking of at least one rotary playback transducer which scans successive parallel tracks on a movable tape record medium to reproduce signals recorded in signal tracks thereon, and including position pulse generating means for generating a position pulse when said at least one transducer rotates into predetermined position with respect to said tape, a control head for playing back control pulses which are recorded along said tape in predetermined position with respect to the signal tracks on said tape, and a servo circuit responsive to position pulses and to said control pulses for controlling the tracking of said at least one transducer relative to said signal tracks, the improvement comprising measuring means for measuring the level of the signals reproduced by said at least one transducer as said transducer scans each record track and for providing a digital count representing the measured level; means for accumulating a number of said digital counts over an interval defined by a selectable number of scans of said at least one transducer; comparator means for comparing the digital counts accumulated over a just-completed interval to the digital counts accumulated over an immediately preceding interval to determine the signal strength of the signals reproduced during said just-concluded interval relative to the signal strength of the signals reproduced during said immediately preceding interval; means for synthesizing periodic position pulses during successive scans of said transducer, each synthesized position pulse being produced when said transducer is within a predetermined range along its scan; phase shift means for selectively varying the phase of said periodic synthesized position pulses by imparting a positive or negative phase shift to the synthesized periodic position pulses during the next-following interval, the polarity of said phase shift being reversed if the signal strength of the signals reproduced during the just-concluded interval is less than the signal strength of the signals reproduced during said immediately preceding interval; and means for supplying said synthesized periodic position pulses to said servo circuit for controlling the tracking of said transducer.

15. The servo control system of claim 14 further comprising means for generating interval defining pulses; and means for changing the repetition rate of said interval defining pulses as a function of the number of polarity reversals of said phase shift.

16. The servo control system of claim 15 wherein said phase shift means is responsive to each interval defining pulse to vary the phase shift imparted to a synthesized position pulse during at least a portion of said interval defining pulse.

17. The servo control system of claim 16 wherein said means for accumulating includes counter means for accumulating said digital counts, said counter means being reset to an initial condition in response to each interval defining pulse; and said comparator means comprises storage means responsive to each interval defining pulse for storing the digital counts accumulated in said counter means, and a digital comparator for comparing the contents of said counter means and said storage means.

18. The servo control system of claim 16 wherein said means for synthesizing periodic position pulses comprises a source of clock pulses for supplying clock pulses having a repetition rate greater than the rotary speed of said at least one transducer; and a clock pulse counter operative to count clock pulses supplied thereto during the period that said transducer is within said predetermined range, said clock pulse counter producing a synthesized position pulse each time a predetermined number of clock pulses have been counted.

19. The servo control system of claim 18 wherein said phase shift means comprises clock pulse adding means selectively operative during an interval defining pulse to increment the count of said clock pulse counter when said transducer is outside said predetermined range so as to impart a negative phase shift to the synthesized periodic position pulses; clock pulse deleting means selectively operative during an interval defining pulse to delete clock pulses supplied to said clock pulse counter so as to impart a positive phase shift to the synthesized periodic position pulses; and selector means for enabling one of said clock pulse adding means and said clock pulse deleting means to operate until the signal strength of the signals reproduced during a just-concluded interval is less than the signal strength of the signals reproduced during an immediately preceding interval and then to enable the other of said clock pulse adding means and said clock pulse deleting means to operate.

20. The servo control system of claim 19 wherein said means for changing the repetition rate of said interval defining pulses comprises polarity reversal counting means for counting polarity reversals of said phase shift; and gating means responsive to the count of said polarity reversal counting means for selecting the repetition rate of said interval defining pulses.

21. The servo control system of claim 20 wherein said clock pulse adding means comprises a gate circuit for receiving said clock pulses and responsive to the count of said polarity reversal counting means for gating a respective number of clock pulses to said clock pulse counter.

22. The servo control circuit of claim 21 wherein said clock pulse deleting means comprises a gate circuit responsive to the count of said polarity reversal counting means for generating an inhibit pulse whose duration is dependent upon said last-mentioned count; and means for inhibiting said clock pulses from being supplied to said clock pulse counter by said inhibit pulse.

* * * * *